(12) United States Patent
Ramasubramanian et al.

(10) Patent No.: US 9,374,285 B1
(45) Date of Patent: Jun. 21, 2016

(54) SYSTEMS AND METHODS FOR DETERMINING NETWORK TOPOLOGIES

(71) Applicant: Big Switch Networks, Inc., Mountain View, CA (US)

(72) Inventors: Srinivasan Ramasubramanian, Redwood City, CA (US); Shudong Zhou, Fremont, CA (US); Daniel C. Hersey, Peoria, AZ (US); Guido Appenzeller, Menlo Park, CA (US); Mandeep Singh Dhami, San Jose, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 570 days.

(21) Appl. No.: 13/761,600

(22) Filed: Feb. 7, 2013

(51) Int. Cl.
 *H04L 12/26* (2006.01)
 *H04L 12/46* (2006.01)
(52) U.S. Cl.
 CPC ............ *H04L 43/08* (2013.01); *H04L 12/4641* (2013.01); *H04L 43/04* (2013.01)
(58) Field of Classification Search
 CPC ....... H04L 41/12; H04L 43/106; H04L 45/60; H04L 45/02; H04L 45/026; H04L 45/04; H04L 45/26; Y10T 307/74; H04W 40/24; H04W 92/20
 See application file for complete search history.

(56) References Cited

U.S. PATENT DOCUMENTS

| | | | |
|---|---|---|---|
| 6,483,818 B1 * | 11/2002 | Ohno | H04W 68/00 370/328 |
| 6,674,727 B1 | 1/2004 | Carroll et al. | |
| 7,096,039 B2 * | 8/2006 | Chuah | H04L 12/189 455/456.5 |
| 7,349,348 B1 * | 3/2008 | Johnson | H04L 29/12339 370/254 |
| 7,583,602 B2 | 9/2009 | Bejerano et al. | |
| 7,738,922 B2 * | 6/2010 | Hashimoto | H04W 48/02 455/411 |
| 7,801,062 B2 | 9/2010 | Oz et al. | |
| 7,873,038 B2 | 1/2011 | LaVigne et al. | |
| 7,894,372 B2 | 2/2011 | Chu et al. | |
| 8,134,964 B2 | 3/2012 | Pan et al. | |
| 8,248,991 B2 * | 8/2012 | Kim | H04H 20/72 348/552 |
| 8,416,796 B2 * | 4/2013 | Forster | H04L 41/0806 370/392 |

(Continued)

OTHER PUBLICATIONS

Pfaff et al., OpenFlow Switch Specification, Dec. 31, 2009, 42 pages.

(Continued)

*Primary Examiner* — Sargon Nano
(74) *Attorney, Agent, or Firm* — Treyz Law Group, P.C.; Michael H. Lyons

(57) ABSTRACT

A controller may control client switches in a network including client and non-client switches. The controller may maintain a link discovery table including entries that identify links between client switches. The controller may classify the links as direct or broadcast links. To classify links of the link discovery table, the controller may direct client switches to send broadcast and directed discovery packets from switch ports. Client switches that receive the discovery packets from other client switches may forward the discovery packets to the controller. The controller may use the discovery packets to classify the links of the link discovery table. The controller may classify ports as broadcast or regular ports based on the classified links. Non-client broadcast domains of the network topology may be identified from the broadcast ports using the broadcast and direct links of the link discovery table.

15 Claims, 31 Drawing Sheets

(56) References Cited

U.S. PATENT DOCUMENTS

| | | | |
|---|---|---|---|
| 8,787,388 B1* | 7/2014 | Adams | H04L 45/38 370/244 |
| 8,990,423 B2* | 3/2015 | Voigt | H04L 41/08 709/218 |
| 9,001,827 B2* | 4/2015 | Appenzeller | H04L 45/54 370/392 |
| 9,008,080 B1* | 4/2015 | Mehta | H04L 49/60 370/327 |
| 9,036,636 B1* | 5/2015 | Sherwood | H04L 45/04 370/392 |
| 9,042,234 B1* | 5/2015 | Liljenstolpe | H04L 45/72 370/238 |
| 9,130,870 B1* | 9/2015 | Swierk | H04L 45/46 |
| 9,144,057 B2* | 9/2015 | Hegge | H04L 65/4076 |
| 2007/0174309 A1 | 7/2007 | Pettovello | |
| 2009/0185507 A1* | 7/2009 | Arkin | H04L 41/12 370/254 |
| 2009/0259652 A1 | 10/2009 | Yamane et al. | |
| 2010/0164685 A1 | 7/2010 | Pering et al. | |
| 2011/0103228 A1* | 5/2011 | Sheth | H04L 45/02 370/238 |
| 2011/0255418 A1 | 10/2011 | van Greunen et al. | |
| 2011/0292832 A1 | 12/2011 | Bottari et al. | |
| 2012/0059930 A1 | 3/2012 | Devarakonda et al. | |
| 2012/0281698 A1* | 11/2012 | Forster | H04L 41/0806 370/392 |
| 2013/0287018 A1* | 10/2013 | Miller | H04L 12/6418 370/357 |

OTHER PUBLICATIONS

McKeown et al., OpenFlow: Enabling Innovation in Campus Networks, Mar. 14, 2008, 6 pages.

Cisco Systems, Cisco Catalyst 6500 Architecture, 1992-2007, 28 pages.

Casado et al., "SANE: A Protection Architecture for Enterprise Networks," Usenix Security, Aug. 2006 (15 pages).

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf.

Swierk et al., U.S. Appl. No. 13/088,262, filed Apr. 15, 2011.

Ramasubramanian et al., U.S. Appl. No. 13/603,160, filed Sep. 4, 2012.

Sherwood et al., U.S. Appl. No. 13/367,256, filed Feb. 6, 2012.

Sherwood et al., U.S. Appl. No. 13/411,496, filed Mar. 2, 2012.

Ramasubramanian et al., U.S. Appl. No. 13/677,046, filed Nov. 14, 2012.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

SYSTEMS AND METHODS FOR DETERMINING NETWORK TOPOLOGIES

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

A network may include switches having controller clients that are controlled by a controller and non-client switches that are not controlled by the controller. Some of the non-client switches may be interposed between client switches. The controller may direct the client switches to forward network packets along network forwarding paths through the network. It may be difficult for the controller for the controller to determine appropriate network forwarding paths in networks that include non-client switches. For example, a group of intervening non-client switches may separate groups of client switches. It would therefore be desirable to provide controllers with the capability to maintain network topology information for such network arrangements.

SUMMARY

A controller such as a centralized controller server or a distributed controller may be used to control client switches in a network. The network may include non-client switches that are not controlled by the controller. The network may include end hosts that are coupled to the switches (e.g., the client and the non-client switches) at switch ports. Switch ports may also couple client switches to other client switches or non-client switches. The end hosts may send network packets that are forwarded through the network by the switches.

The controller may maintain a link discovery table including entries that identify links between client switches. Each link may include a source switch port and a destination switch port. The entries of the link discovery table may be processed to determine a network domain topology that includes client domains and non-client domains.

The controller may classify the links as direct or broadcast links. To classify links of the link discovery table, the controller may direct client switches to send broadcast and directed discovery packets from switch ports. Broadcast discovery packets may include a reserved Ethertype and information identifying the controller. The controller may control the rate at which discovery packets are sent using a maintenance and/or quarantine queue. The controller may add ports to the maintenance and quarantine queues and periodically perform network discovery operations on some of the ports in the maintenance and quarantine queues.

Client switches that receive the discovery packets from other client switches may forward the discovery packets to the controller. The controller may use information stored in the discovery packets and the type of the discovery packets to classify the links of the link discovery table. The controller may classify ports as broadcast or regular ports based on the classified links. Ports that are included in at least one broadcast link, at least three links of any type, or included in at least one pair of asymmetrical links may be classified as broadcast ports. The remaining switch ports may be classified as regular ports. Broadcast domains of the network topology may be identified by computing reachability graphs from broadcast ports using the broadcast and direct links of the link discovery table.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
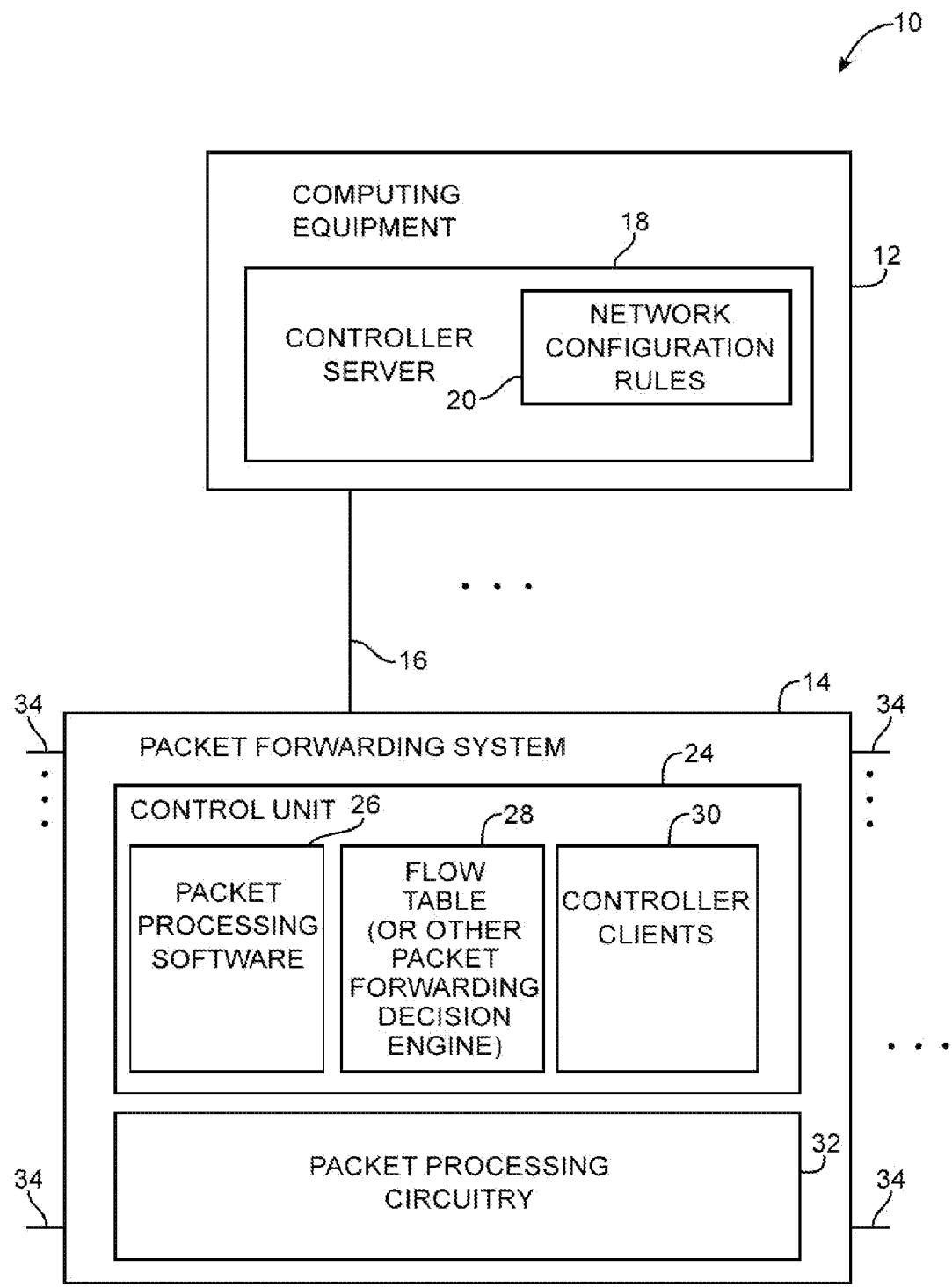
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
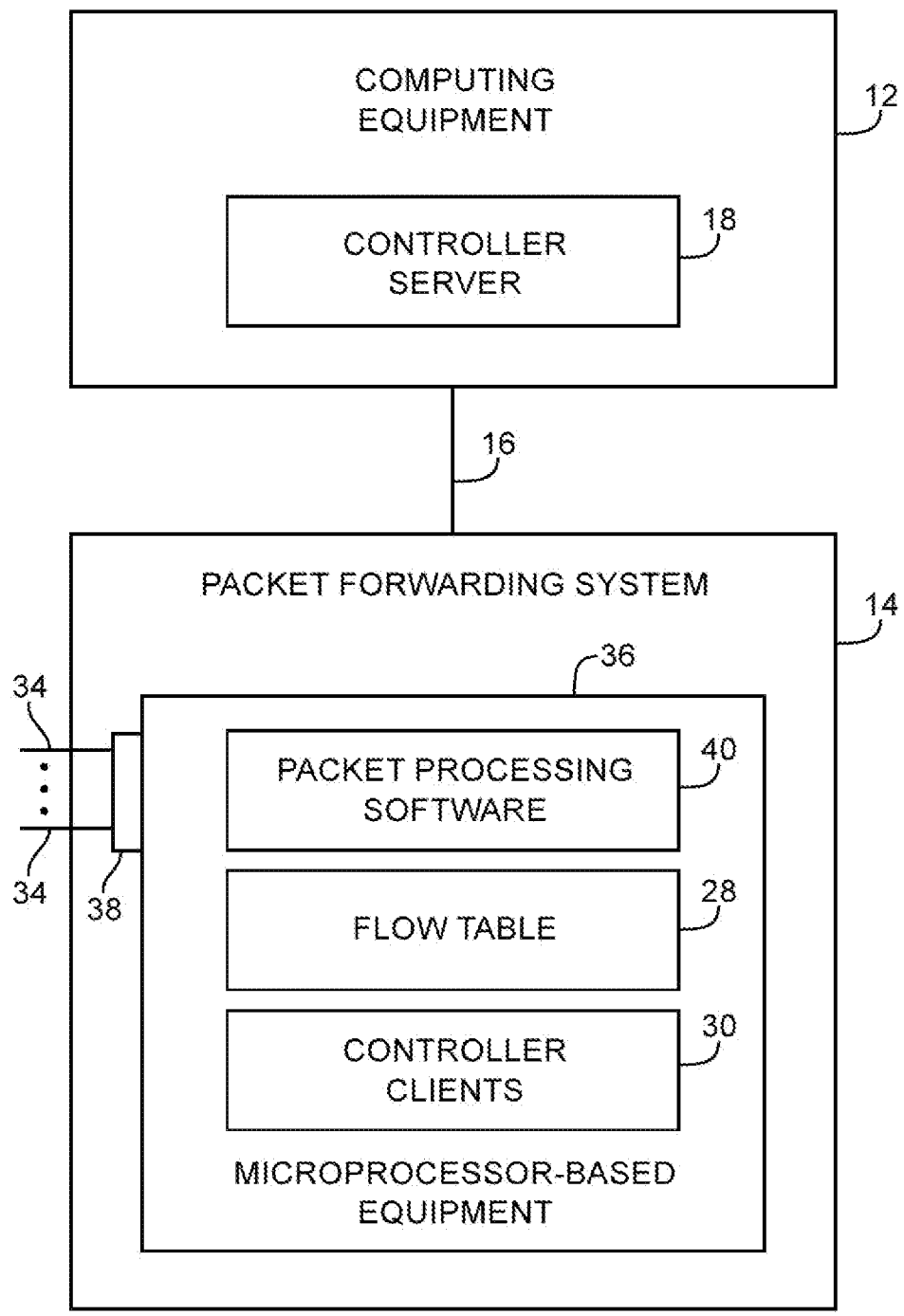
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
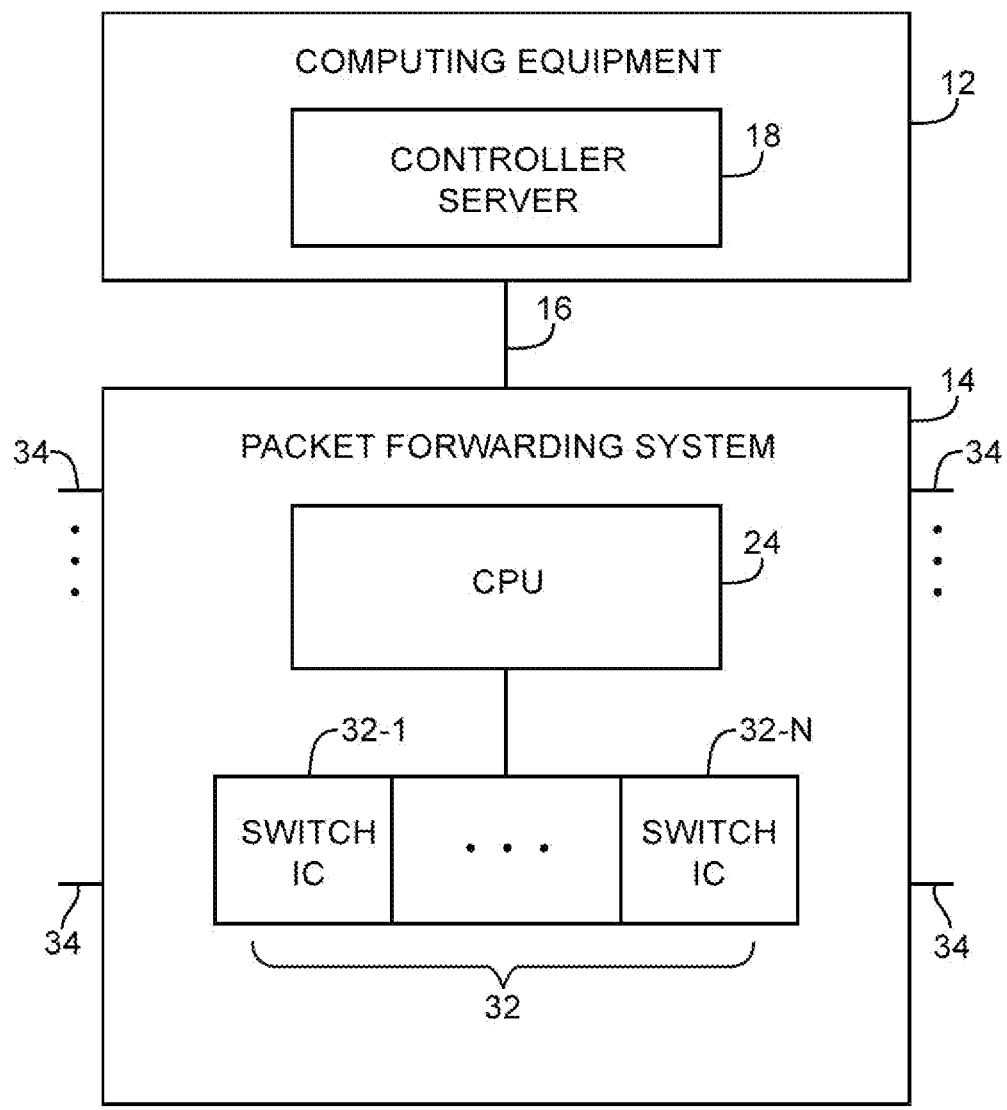
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
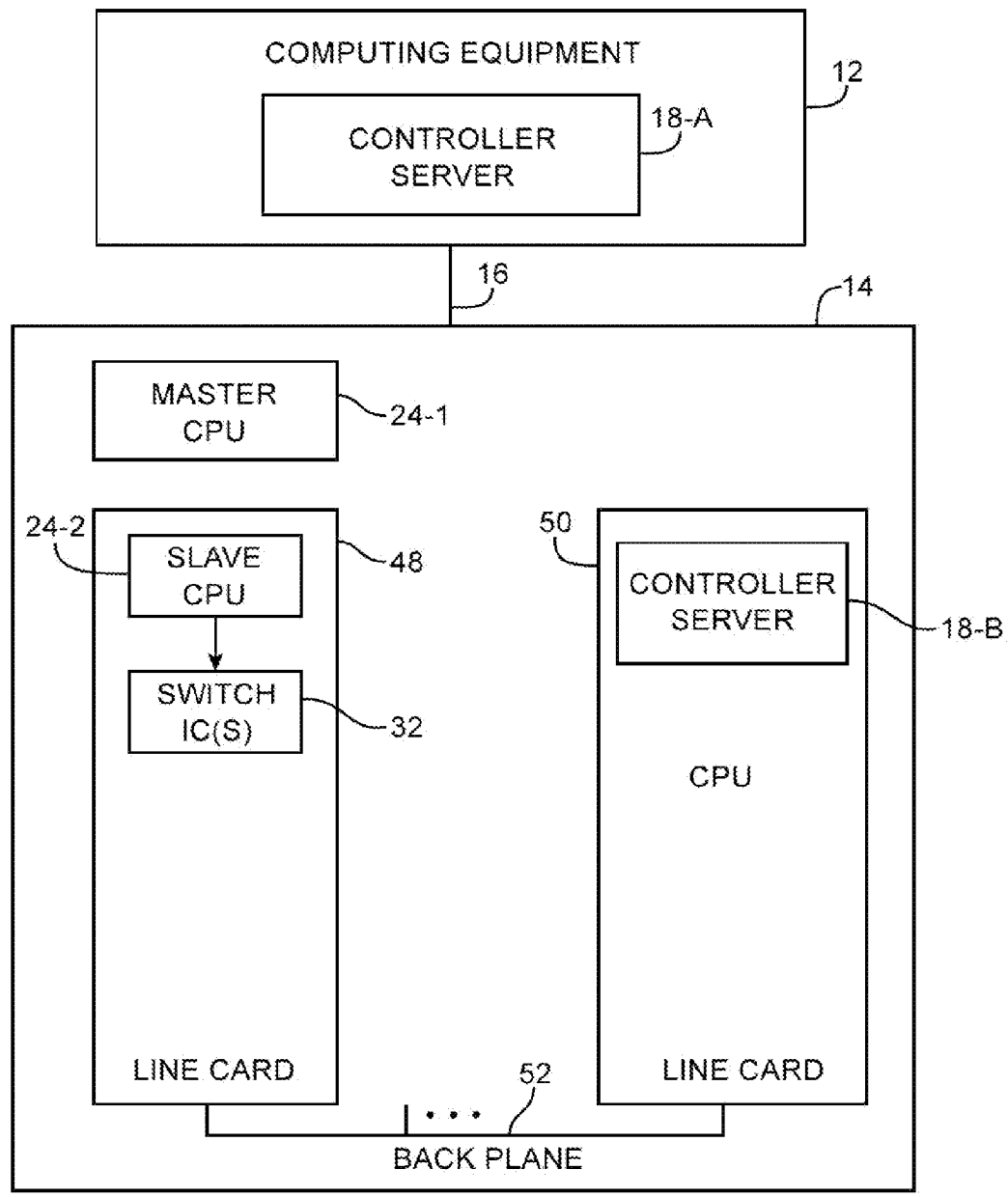
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
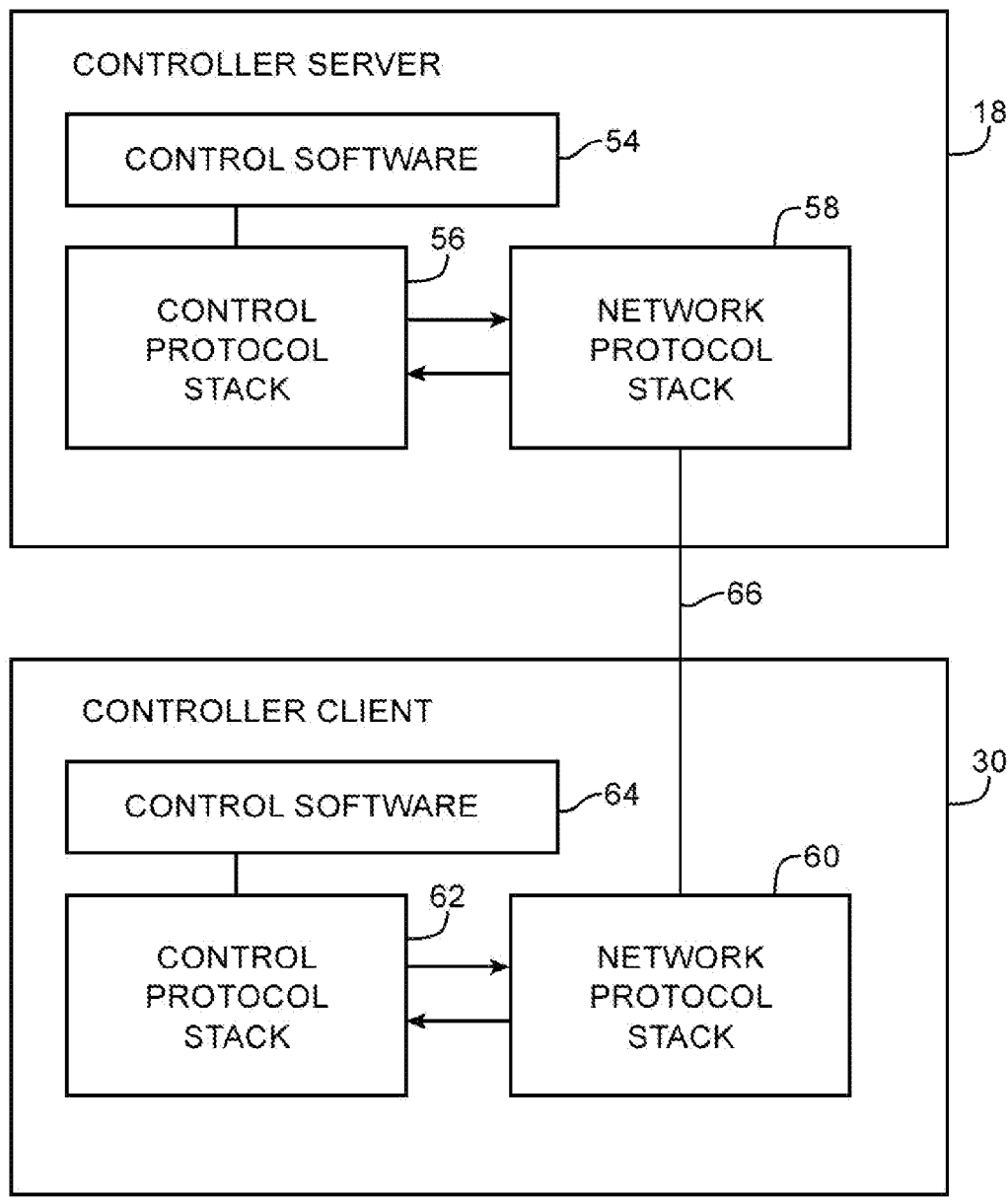
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
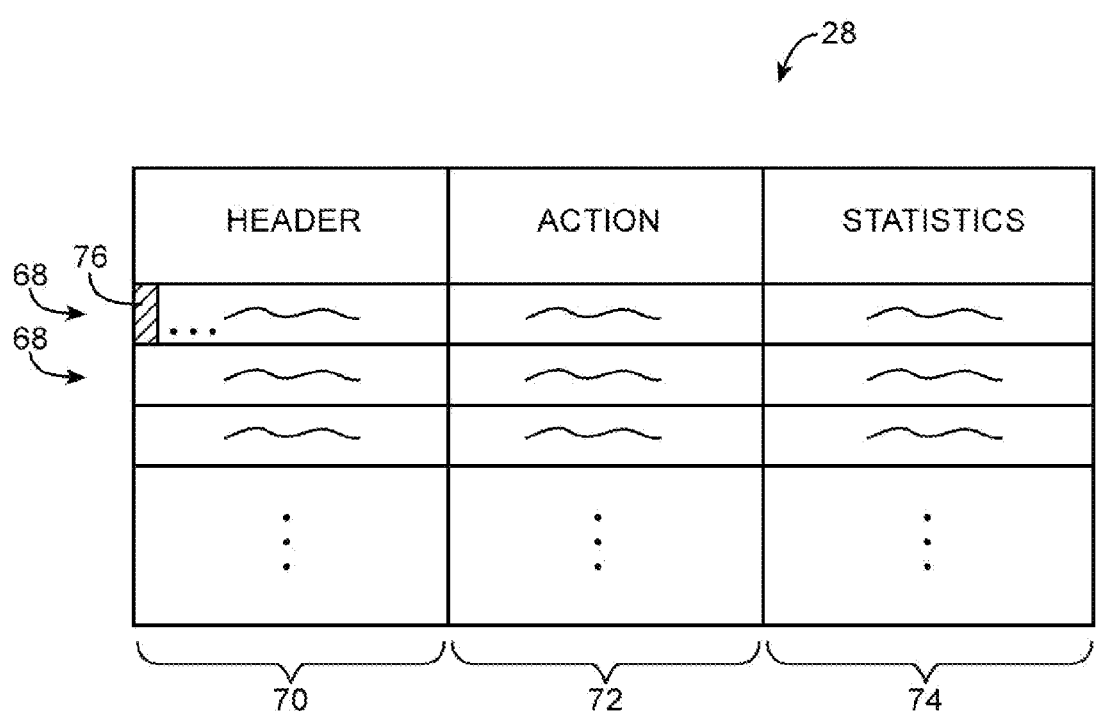
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform Internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
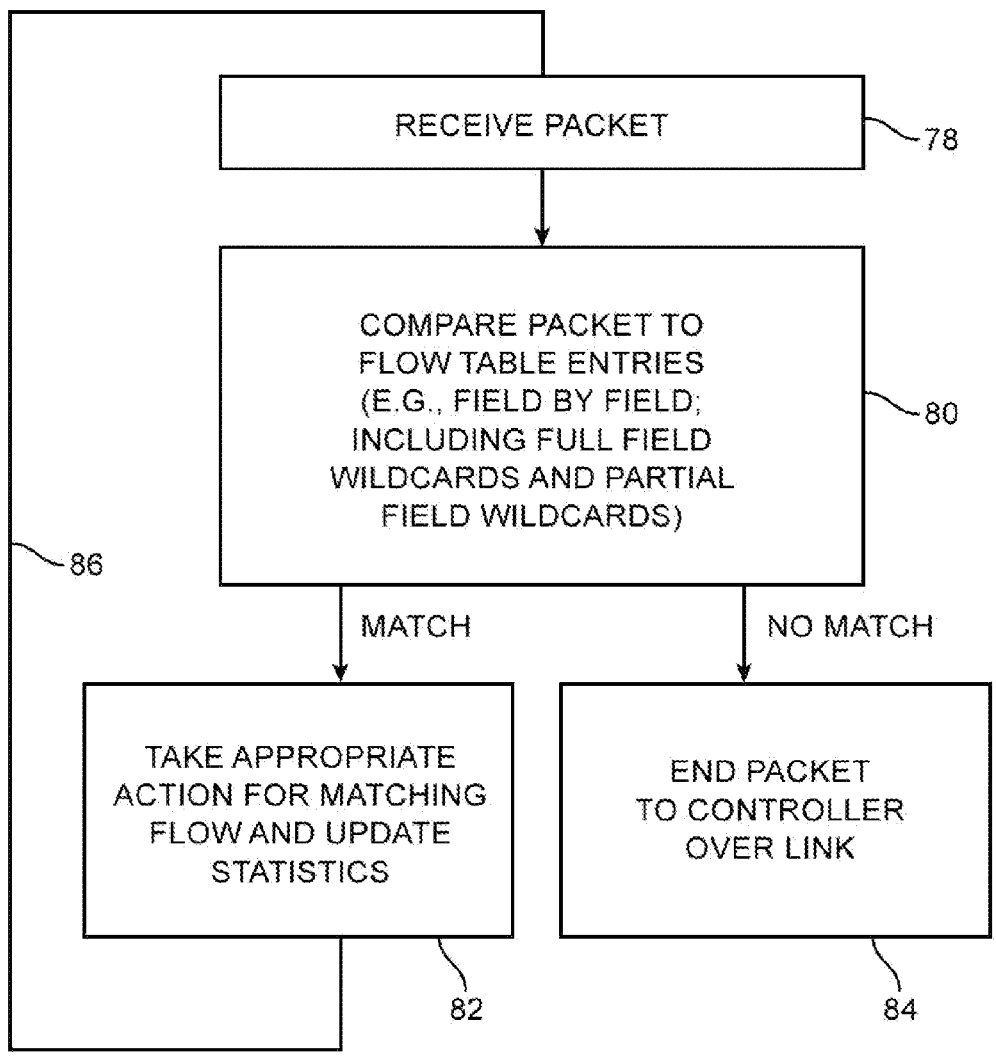
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

A controller (e.g., a controller server or other controllers implemented on computing equipment) may be used to control switches in a network. The controller may include one or more controller servers or may be distributed throughout one or more of the switches (e.g., portions of the controller may be implemented on storage and processing circuitry of multiple switches). An illustrative network 100 that includes a controller 18 is shown in FIG. 8.

Figure 8:
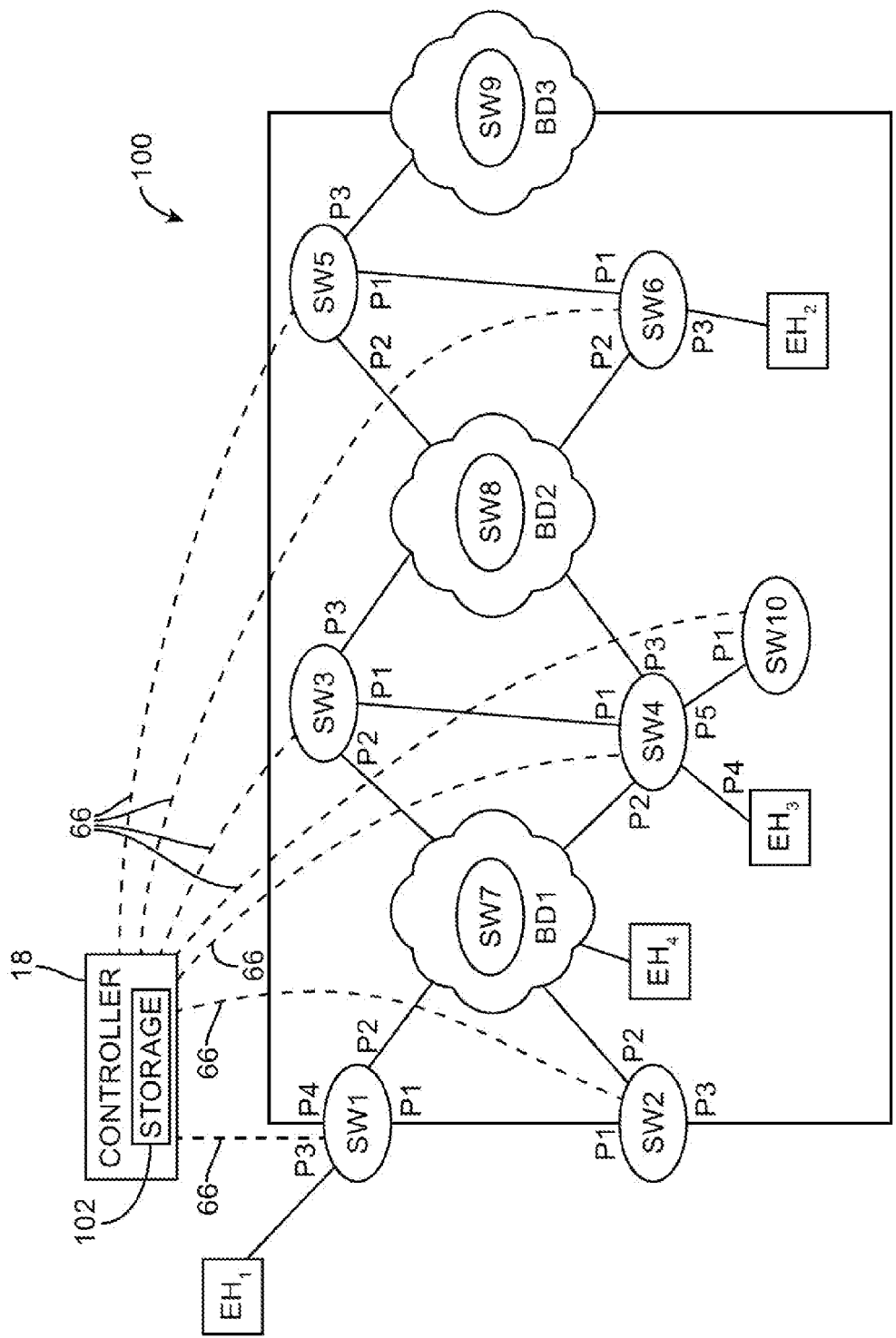
FIG. 8 is a diagram of an illustrative network that includes client switches that are controlled by a controller and non-client switches that do not communicate with the controller in accordance with an embodiment of the present invention.

As shown in FIG. 8, network 100 may include switches that communicate with controller 18 via control paths 66. In the example of FIG. 8, network 100 includes switches SW1, SW2, SW3, SW4, SW5, and SW6 that are controlled by controller 18. Switches that are controlled by controller 18 may include controller clients that communicate with controller 18 and may sometimes be referred to as client switches. Control paths 66 may include additional switches or other network elements that forward network control packets between controller 18 and the client switches.

Switches in network 100 that do not communicate with controller 18 via control paths 66 (e.g., because the switches do not include controller clients) may be referred to as non-client switches. In some scenarios, client switches in network 100 may be separated by intervening non-client switches. For example, client switch SW1 may be separated from client switch SW3 by intervening non-client switch SW7 and client switch SW4 may be separated from client switch SW5 by non-client switch SW8.

Switches in network 100 may have ports (e.g., ports 34 of FIG. 1) that are coupled to network devices (elements) such as other switches, end hosts, or other desired network devices. For example, switch SW1 may include ports P1, P2, P3, and P4, switch SW2 may include ports P1, P2, and P3, etc. Port P1 of switch SW1 may be coupled to port P1 of switch SW2. Ports P2 and P4 of switch SW1 may be coupled to non-client switches (e.g., non-client switches SW7 and SW9). Port P3 of switch SW1 may be coupled to end host EH1.

It may be difficult for controller 18 to determine network topologies that include non-client switches, because the non-client switches do not communicate with controller 18 via paths 66. Groups of non-client switches may form non-client domains (clusters). The non-client domains may, for example, form broadcast domains. Non-client switches of a given broadcast domain may respond to receipt of a broadcast network packet (e.g., network packets that have been marked as broadcast packets) by flooding that broadcast domain with the broadcast network packet.

Figure 9A:
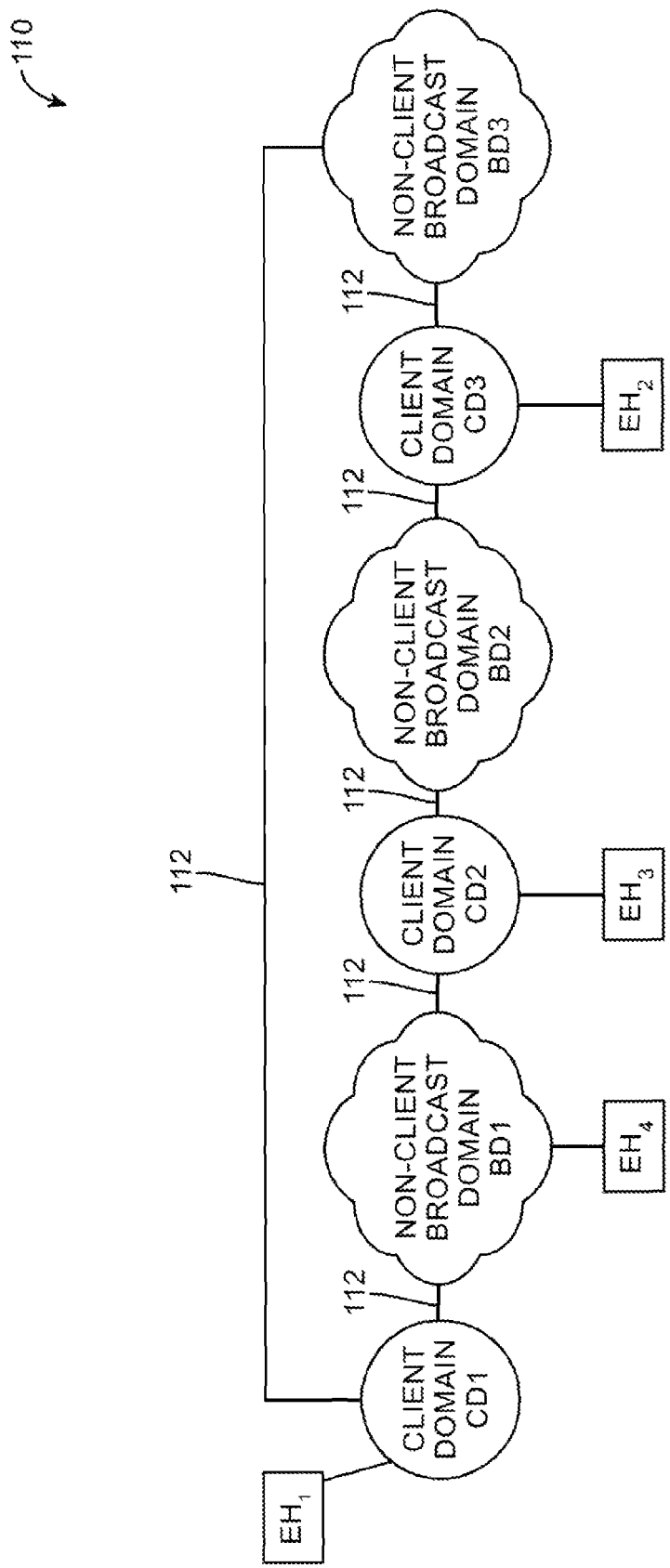
FIG. 9A is a diagram showing how the network of FIG. 8 may be organized into client and non-client domains that form a network domain topology in accordance with an embodiment of the present invention.

Controller 18 may maintain information that describes the topology of network 100. For example, controller 18 may communicate with client switches using network discovery packets such as broadcast discovery packets and directed discovery packets to identify network connections between client switches in network 100. The network topology information may be maintained in storage 102 at controller 18 or at remote storage equipment (not shown). The network topology information may include network domain topology information describing domains (e.g., groups of switches) and network connections between the domains. FIG. 9A is an illustrative diagram of a network domain topology 110 describing network 100 (FIG. 8) that may be maintained by controller 18. Network domain topology 110 may sometimes be described as a higher-level network topology.

As shown in FIG. 9A, controller 18 may identify client domains (clusters) and non-client broadcast domains. The client domains may be formed from groups of interconnected client switches, whereas the non-client broadcast domains may be formed from groups of non-client switches. For example, client domain CD1 may include client switches SW1 and SW2 that are coupled via network paths that are controlled by controller 18. As another example, non-client broadcast domain BD2 may include non-client switch SW8.

Network domains in the network domain topology may be coupled by network connections 112 that each includes a set of network paths between a given pair of network domains. For example, network connections 112 between client domain CD1 and non-client broadcast domain BD1 may include network paths between port P2 of switch SW1 and domain BD1 and network paths between port P2 of switch SW2 and domain BD1.

Figure 9B:
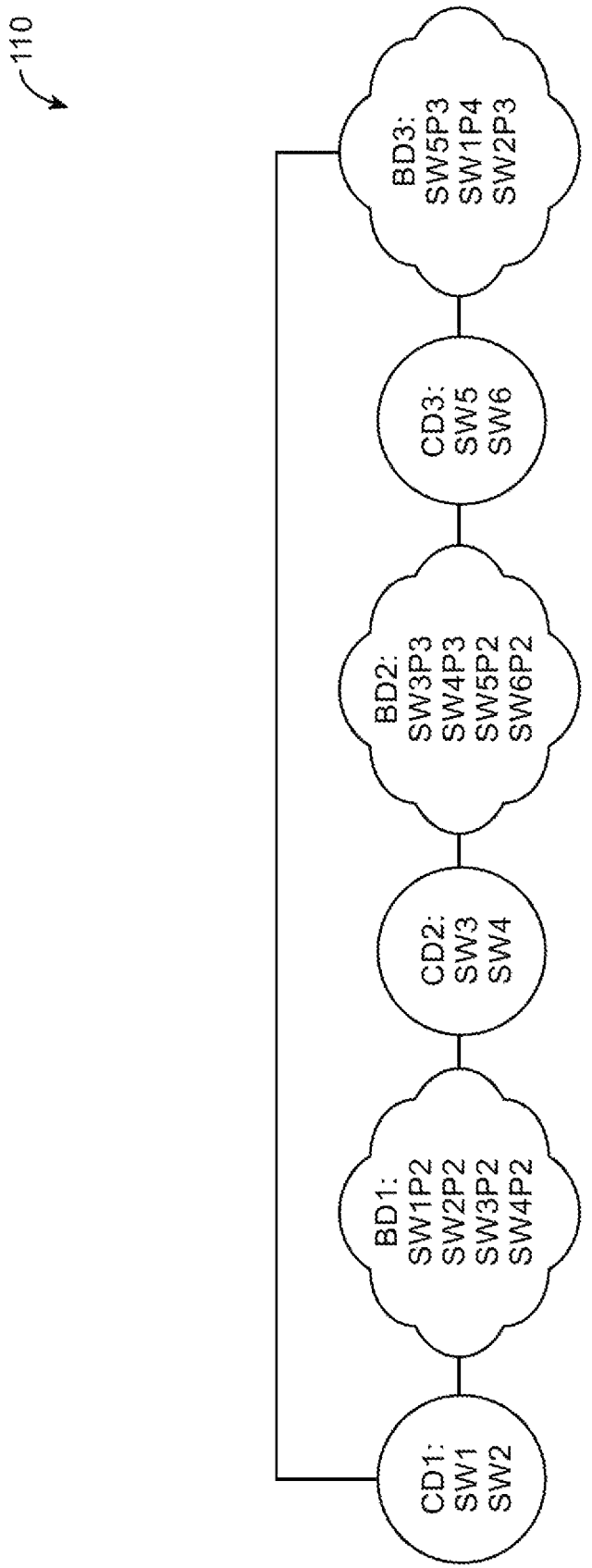
FIG. 9B is a diagram of network domain information that may be stored by a controller in accordance with an embodiment of the present invention.

Controller 18 may identify network domains using client switches and ports of the client switches. FIG. 9B is an illustrative diagram of network domain topology 110 in which client domains are represented by groups of client switches and non-client domains (e.g., broadcast domains) are represented by ports of the client switches that are coupled to the non-client domains. For example, client domain CD1 may be represented by client switches SW1 and SW2, whereas broadcast domain BD1 may be represented by port P2 of client switch SW1, port P2 of client switch SW2, port P2 of client switch SW3, and port P2 of client switch SW4. Ports that are associated with broadcast domains may sometimes be referred to herein as broadcast ports. Network domain topology 110 of FIG. 9B may be maintained by controller 18 using lists, databases, tables, or any other desired data structures (e.g., maintained at storage 102). For example, an entry in a database that corresponds to client domain CD2 may identify client switches SW3 and SW4.

Figure 10:
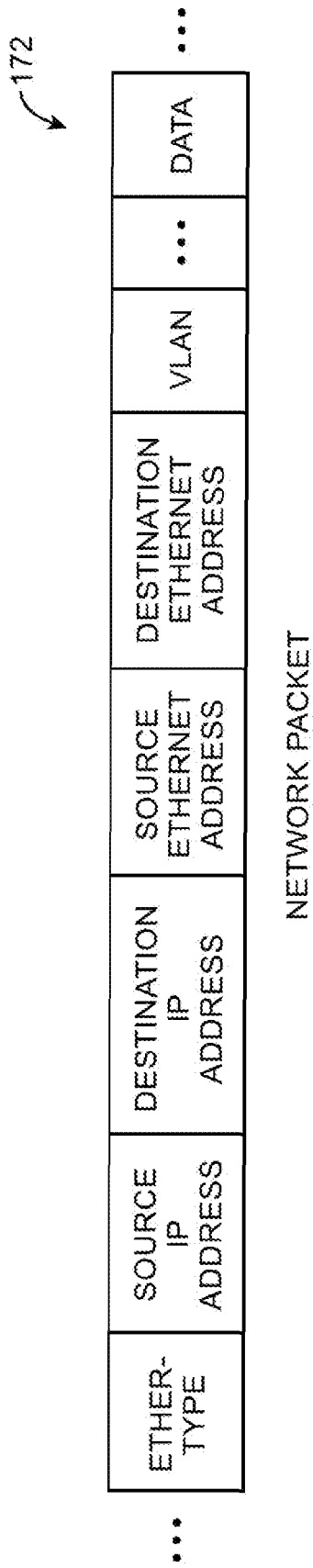
FIG. 10 is an illustrative network packet that may be received by a controller from end hosts in accordance with an embodiment of the present invention.

FIG. 10 is an illustrative diagram of a network packet that may be forwarded through a network. Network packet 172 may be sent from a source end host to a destination end host, from controller 18 to a client switch, or between any desired network source and destination. As shown in FIG. 10, network packet 172 may include an Ethertype, a source internet protocol (IP) address, a destination IP address, a source Ethernet address, a destination Ethernet address, and a virtual local area network (VLAN) identifier stored in header fields of network packet 172. Network packet 172 may include data to be forwarded from the source end host to the destination end host through the network.

The Ethertype may identify the type of network protocol used to encapsulate information in the data field of the network packet. For example, the Ethertype may identify that the data field includes information encapsulated using the Internet Protocol, the Link Layer Discovery Protocol, or other protocols such as broadcast discovery protocols.

The source IP address and source Ethernet address of network packet 172 may correspond to addresses associated with the source end host, whereas the destination IP address and destination Ethernet address may correspond to addresses associated with the destination end host. The VLAN identifier may identify a virtual local area network that is associated with the source end host. If desired, network packet 172 may include any desired combination of network attributes shown in FIG. 10 (e.g., information stored in network packet header fields) or may include additional header fields associated with network protocols (e.g., IP header fields, Ethernet header fields, etc.).

Network switches may forward network packets such as packet 172 based on network attributes stored in the header fields of network packet 112. For example, client switches may be provided with flow table entries via control paths 66 that direct the client switches to identify network packets that are destined for an end host based on destination IP and Ethernet addresses of the network packets. In this scenario, the flow table entries may direct the client switches to forward the identified network packets to the end host through predetermined forwarding paths (e.g., network paths that have been determined by controller 18 using network topology information or other desired information).

Figure 11:
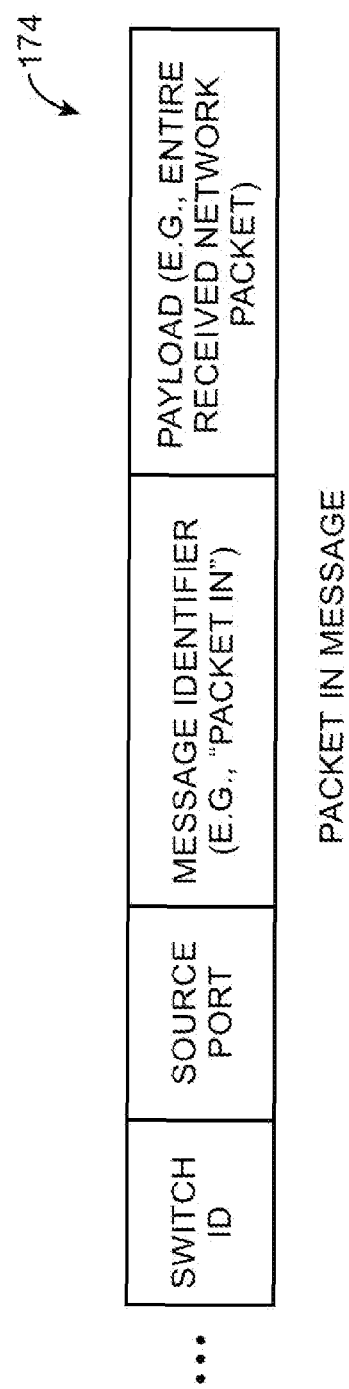
FIG. 11 is an illustrative packet in message including a network packet that may be received by a controller from client switches in accordance with an embodiment of the present invention.

If an appropriate flow table entry does not exist for a network packet received at a client switch (e.g., if header fields of the network packet do not match any flow table entries that have been provided to the client switch by controller 18), the client switch may forward the network packet to the controller server along with additional information that is available to the client switch. FIG. 11 is an illustrative packet in message 174 that may be sent by a client switch to forward a network packet to controller 18 via control paths 66.

As shown in FIG. 11, packet in message 174 may include a switch ID, a source port, a message identifier, and a payload. The switch ID may identify the switch that is sending the packet in message. The source port may identify the switch port at which the network packet was received. The message identifier may identify the type of message (e.g., a packet in message). The payload may include the entire network packet that is being forwarded to controller 18 (e.g., a network packet received from an end host). If desired, the payload may include a portion of the network packet instead of the entire network packet.

Figure 12:
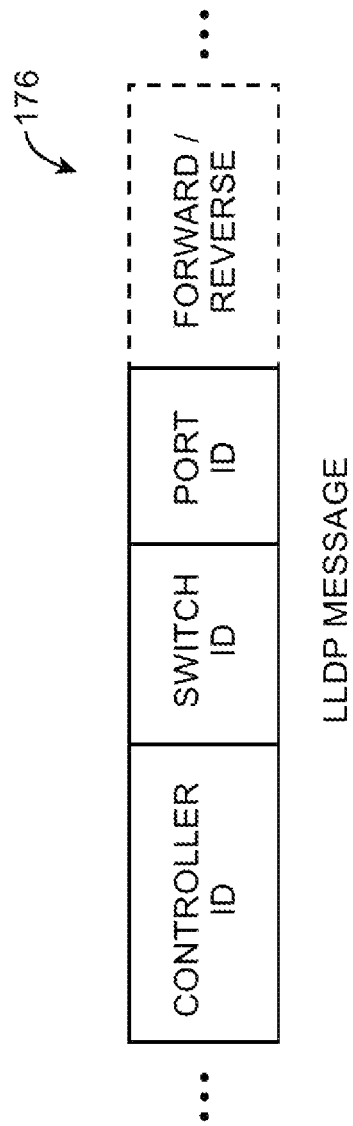
FIG. 12 is a diagram of an illustrative Link Layer Discovery Protocol (LLDP) message in accordance with an embodiment of the present invention.

Controller 18 may issue commands to client switches in network 100 that direct the client switches to perform desired tasks. To discover and maintain network topology information, controller 18 may direct client switches to forward controller-generated network packets and use corresponding packet-in messages received from the client switches to determine the network topology. The controller-generated network packets may include directed discovery packets. Client switches that receive directed discovery packets from other switches process the directed discovery packets without flooding the network with the directed discovery packets. FIG. 12 is a diagram of an illustrative Link Layer Discovery Protocol (LLDP) message 176 that may be included in a directed discovery packet. Discovery packets that include Link Layer Discovery Protocol messages may sometimes be referred to as LLDP discovery packets. LLDP message 176 may be sent between client switches using the Link Layer Discovery Protocol (e.g., network packets that include LLDP message 176 in a data field may include an Ethertype field that identifies the network packets as LLDP packets).

LLDP message 176 may contain fields with information such as the identification of controller 18 (controller ID), the source switch (switch ID), and the source switch port (port ID). As an example, controller 18 may send a control packet to switch SW1 that directs switch SW1 to send a controller-generated LLDP message 176 from port P1 of switch SW1. In this scenario, LLDP message 176 may identify port P1 of switch SW1 as the source port and switch SW1 as the source switch.

Figure 13:
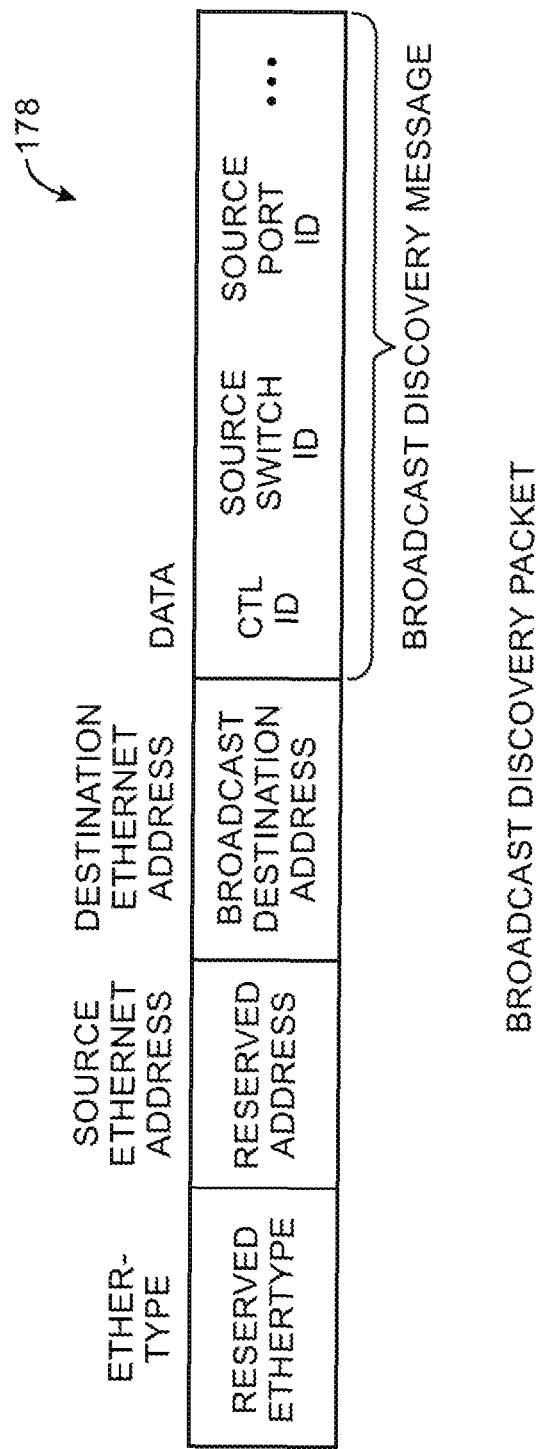
FIG. 13 is a diagram of an illustrative broadcast discovery packet in accordance with an embodiment of the present invention.

LLDP network packets that include LLDP message 176 may serve to identify direct connections between client switches. In network arrangements in which client switches are separated by non-client switches, direct discovery packets such as LLDP discovery packets may be dropped by non-client switches and fail to reach controller 18. In such scenarios, it may be desirable for controller 18 to generate broadcast packets that are flooded by the non-client switches. FIG. 13 is a diagram of an illustrative broadcast discovery packet 178 that may be generated by controller 18 to help determine network topology information.

As shown in FIG. 13, broadcast discovery packet 178 may include a reserved Ethertype in an Ethertype header field, a reserved Ethernet address in a source Ethernet address field, a broadcast destination address in a destination Ethernet address field, and a broadcast discovery message in a data field.

The broadcast discovery message stored in packet 178 may include information used by controller 18 to identify links (connections) between client switches in a network. The information may include a controller (CTL) ID, a source switch ID, a source port ID, and other controller-generated information (if desired). The controller ID may identify controller 18 in scenarios such as when multiple controllers control switches in a network. The source switch ID and source port ID may identify the source switch and source switch port used to originate the broadcast discovery message. Broadcast discovery packet 178 may sometimes be referred to as a tagged broadcast packet or a tagged broadcast discovery packet, because packet 178 is tagged with a controller identifier (CTL ID).

Figure 14:
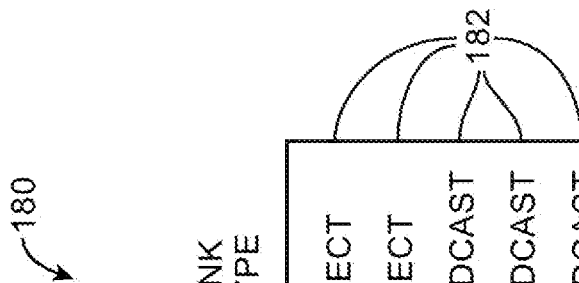
FIG. 14 is a diagram of an illustrative link discovery table that may be maintained by a controller in accordance with an embodiment of the present invention.

Controller 18 may direct switches to send directed discovery packets (e.g., LLDP packets that include LLDP message 176) and broadcast discovery packets (e.g., packet 178) to identify and classify links in a network. Discovered links may be maintained in a table such as link discovery table 180 of FIG. 14. As shown in FIG. 14, link discovery table 180 may include entries 182. Each entry 182 may identify a link, the link type of the identified link, and timestamps associated with when the link was identified. The identified link may be directional and represent a network connection from a source switch port to a destination switch port. In other words, an identified link represents a network connection through which discovery packets have been successfully forwarded from the source switch port to the destination switch port. The link type may reflect whether the link is a direct link between two client switches (e.g., a link without intervening client or non-client switches) or a broadcast link (e.g., a link associated with a non-client broadcast domain including one or more non-client switches that separate the source and destination switch ports). Controller 18 may determine the link type based on the type of packet received and information such as source and destination switch port information retrieved from the packet.

As an example, a first entry 182 may identify a direct link from port P1 of client switch SW1 to port P1 of client switch SW2 (see, e.g., FIG. 8). The direct link of the first entry may have been discovered upon receiving a directed discovery packet at time T1 from client switch SW2 (e.g., an LLDP discovery packet sent from client switch SW1 from port P1 that is received and forwarded to controller 18 by client switch SW2). The time at which the discovery packet was received by controller 18 may be stored as a timestamp in a corresponding field (e.g., a directed discovery packet timestamp field or a broadcast discovery packet timestamp field).

Figure 15A:
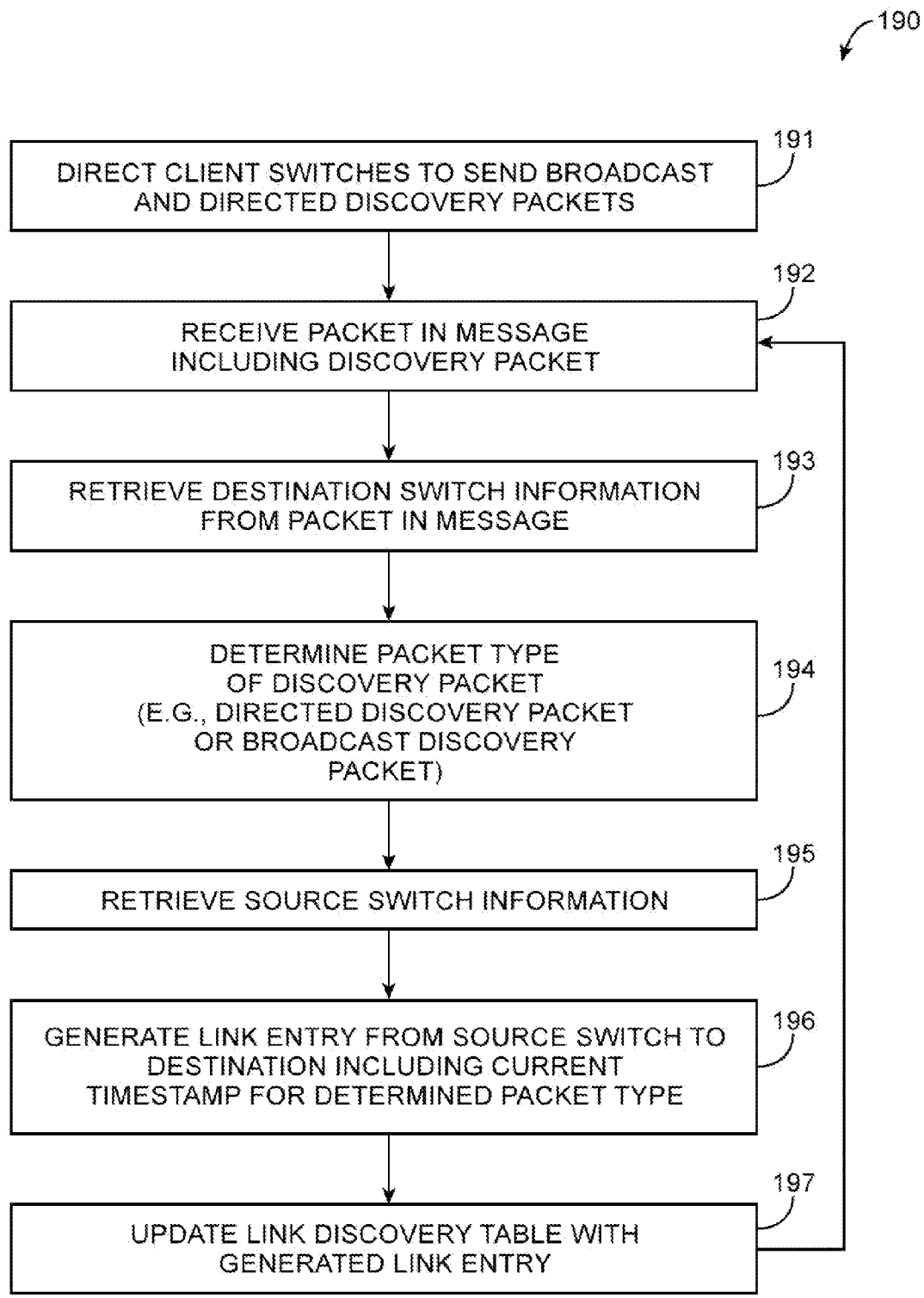
FIG. 15A is a flow chart of illustrative steps that may be performed by a controller to generate a link discovery table in accordance with an embodiment of the present invention.

FIG. 15A is a flowchart 190 of illustrative steps that may be performed by controller 18 to create and maintain link discovery table 180.

During step 191, controller 18 may direct client switches to send broadcast discovery packets and directed discovery packets. Controller 18 may direct each client switch to send directed discovery packets from each switch port of that client switch. The directed discovery packet from each switch port may be an LLDP packet identifying controller 18, that switch port, and the corresponding switch. Controller 18 may similarly direct each client switch to send a broadcast discovery packet 178 from each switch port of that client switch.

The discovery packets sent by client switches during step 191 may be received at other switches. Discovery packets received at client switches may be forwarded to controller 18 (e.g., because controller 18 has provided flow table entries that direct the client switches to forward discovery packets to controller 18 or because no flow table entries for discovery packets exist in flow tables of the client switches). During step 192, controller 18 may receive a discovery packet from a client switch. The discovery packet may be received as part of a packet in message such as packet in message 174 of FIG. 11.

During step 193, controller 18 may retrieve destination switch information from the packet in message. The destination switch information may be retrieved from switch ID and source port fields of the packet in message, because these fields identify the switch and the port at which the discovery packet was received. For example, switch SW2 that receives a discovery packet at port P1 may forward the discovery packet to controller 18 as a packet in message with information identifying switch SW2 and port P1 of switch SW2 in the switch ID and source port fields.

During step 194, controller 18 may determine whether the discovery packet is a directed discovery packet or a broadcast discovery packet. Controller 18 may use information in header fields of the discovery packet to determine whether the discovery packet is directed or broadcasted. For example, a directed LLDP packet may include an LLDP Ethertype, whereas a broadcast discovery packet may include a reserved broadcast discovery Ethertype (e.g., a reserved Ethertype associated with controller 18).

During step 195, controller 18 may retrieve source switch information from the discovery packet. The source switch information may be determined from information stored in the data field of the discovery packet (e.g., from an LLDP message 176 or from a broadcast discovery message stored in the data field). For example, the source switch information may be retrieved from a switch ID and a port ID field of LLDP message 176 or the broadcast discovery message of broadcast discovery packet 178.

During step 196, controller 18 may generate a link entry for the link from the identified source switch and source port to the identified destination switch and destination port (e.g., a link entry 182). The link type field may initially be left empty or set to a null value. A corresponding timestamp (e.g., directed or broadcast) may be set to the current time during step 196, may be set during step 192 when the packet in message is received, or may be set at any desired time between processing of steps 192-196.

During step 197, controller 18 may update link discovery table 180 with the generated link entry. If the link associated with the link entry already exists in table 180, the timestamp fields may be updated with the generated link entry. If the link does not exist in table 180, the generated link entry may be added.

Figure 15B:
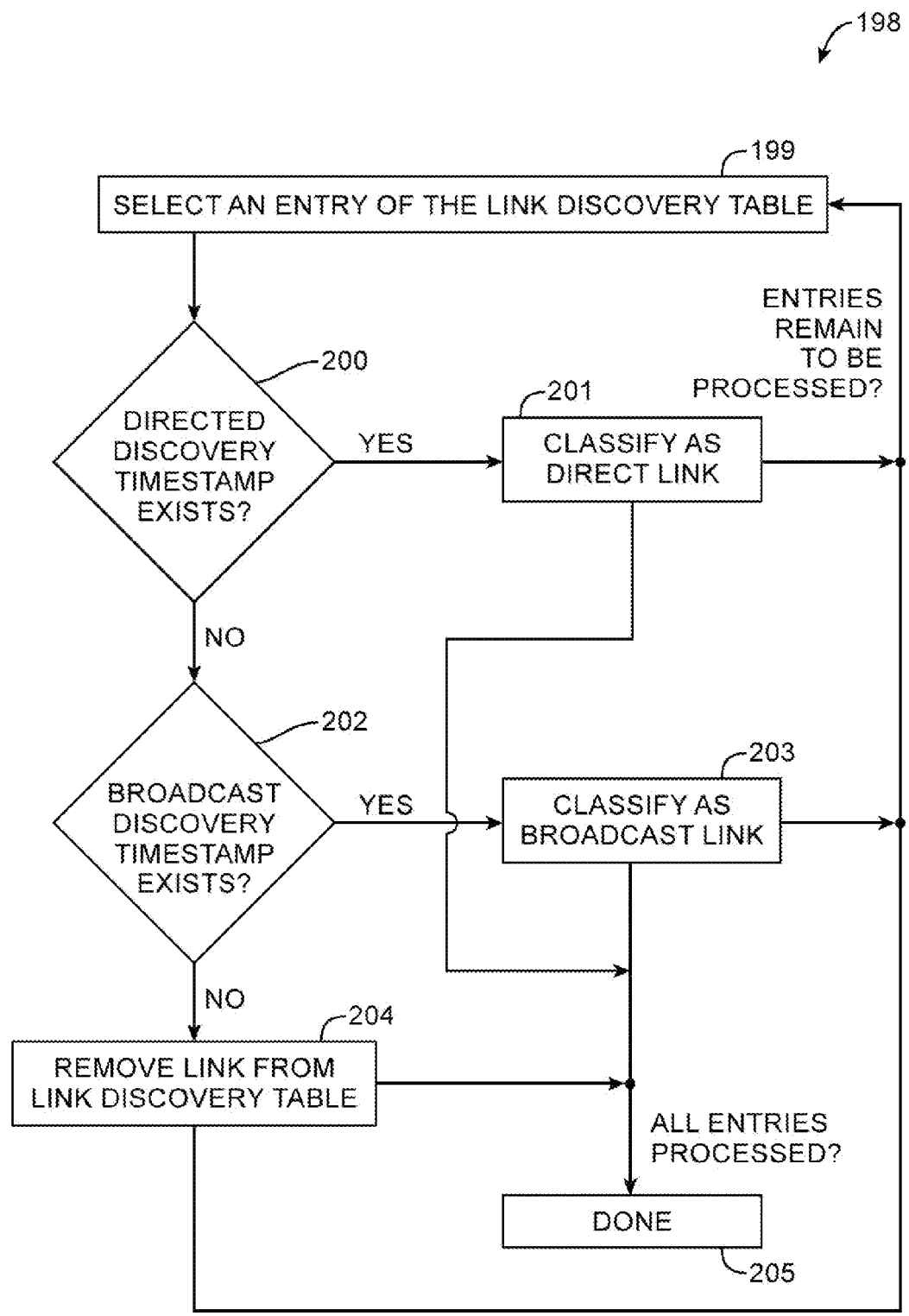
FIG. 15B is a flow chart of illustrative steps that may be performed by a controller to classify links of a link discovery table in accordance with an embodiment of the present invention.

The link type of each entry 182 may be determined based on directed and broadcast discovery timestamp information from that entry. FIG. 15B is an illustrative flow chart of steps that may be performed by controller 18 to determine link types for link discovery table 180.

During step 198, controller 18 may select an entry of the link discovery table. During subsequent step 200, controller 18 may determine whether the selected entry includes a valid directed discovery timestamp (e.g., a timestamp that is not a null value). In response to determining that a directed discovery timestamp exists, the link may be classified as a directed link during step 201 and the link classification may be stored in the selected entry. If table entries remain to be processed, the process may subsequently return to step 199. If all entries have been processed, the operations of flow chart 198 may be complete. In response to determining that no valid directed discovery timestamp exists (e.g., the directed discovery timestamp is invalid), the operations of step 202 may be performed.

During step 202, controller 18 may determine whether the selected entry includes a valid broadcast discovery timestamp. In response to determining that a broadcast discovery timestamp exists, the link may be classified as a broadcast link during step 203 and the link type of the entry may be set to broadcast. If table entries remain to be processed, the process may subsequently return to step 199 or, if all entries have been processed, the operation may be complete. In response to determining that no broadcast discovery timestamp exists during step 202, the link may be removed from the link discovery table by deleting the selected entry. In other words, if no timestamp exists, then the link likely does not exist in the current topology of the network.

The operations of flow chart 198 may effectively classify each link as a direct link if a directed discovery packet was previously received via that link or as a broadcast link if no directed discovery packet was received via that link and a broadcast discovery packet was received via that link. In other words, direct link classifications may take priority over broadcast link classifications.

Figure 16:
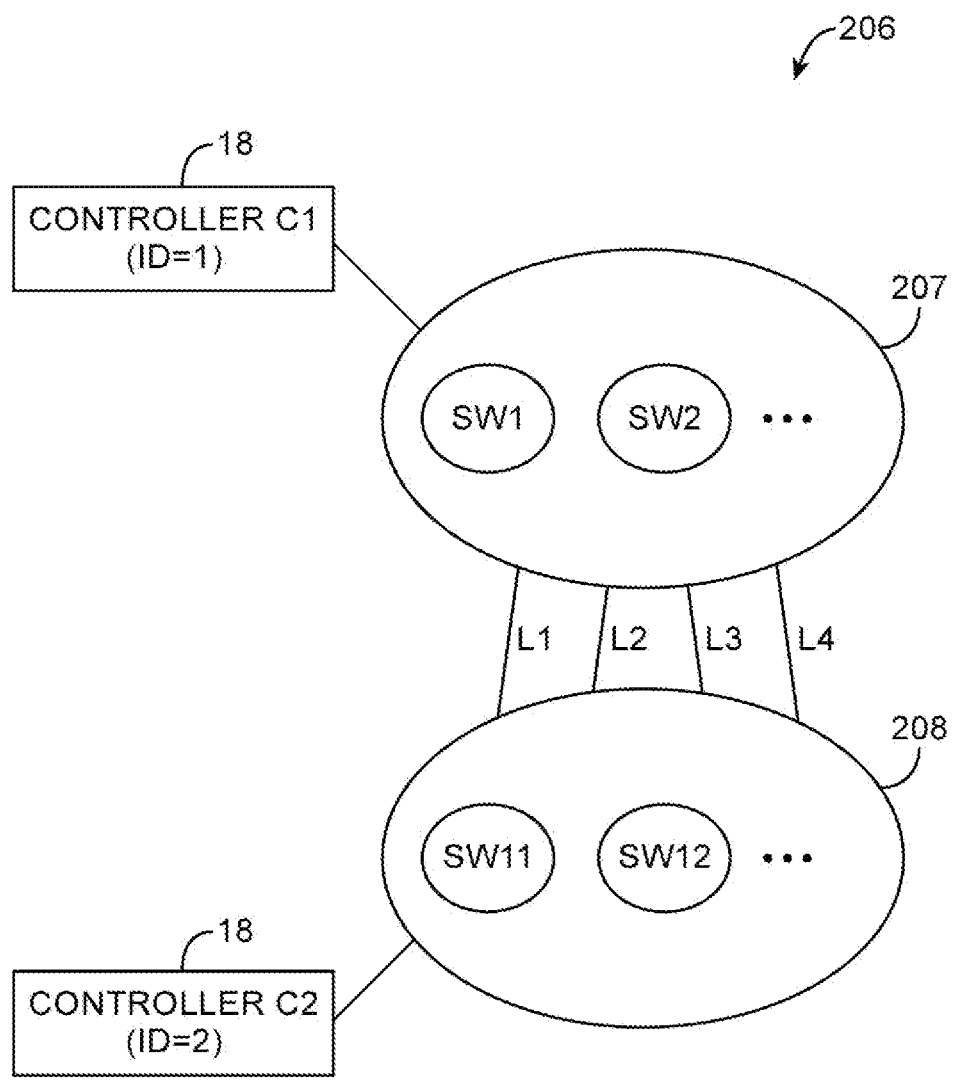
FIG. 16 is a diagram of an illustrative network that includes multiple controllers that control respective portions of a network in accordance with an embodiment of the present invention.

In some scenarios, it may be challenging for controller 18 to maintain link discovery table 180 accurately. Consider the scenario of FIG. 16 in which a network 206 includes multiple controllers that control different portions of network 206. In the example of FIG. 16, controller C1 having controller ID 1 may control client switches in a first network portion 207 (e.g., client switches SW1 and SW2), whereas controller C2 having controller ID 2 may control client switches in a second network portion 208 (e.g., client switches SW11 and SW12). Network portions 207 and 208 may be connected via links L1, L2, L3, and L4 between switch ports of network portions 207 and 208. In this scenario, controllers C1 and C2 can potentially receive discovery packets that have been sent from a different controller. For example, controller C1 can receive a broadcast discovery packet from switches controlled by controller C2 via link L1. It can be challenging for controllers C1 and C2 to handle broadcast discovery packets from different controllers without creating forwarding loops or mistakenly disabling links, because controllers C1 and C2 do not directly communicate.

Figure 17:
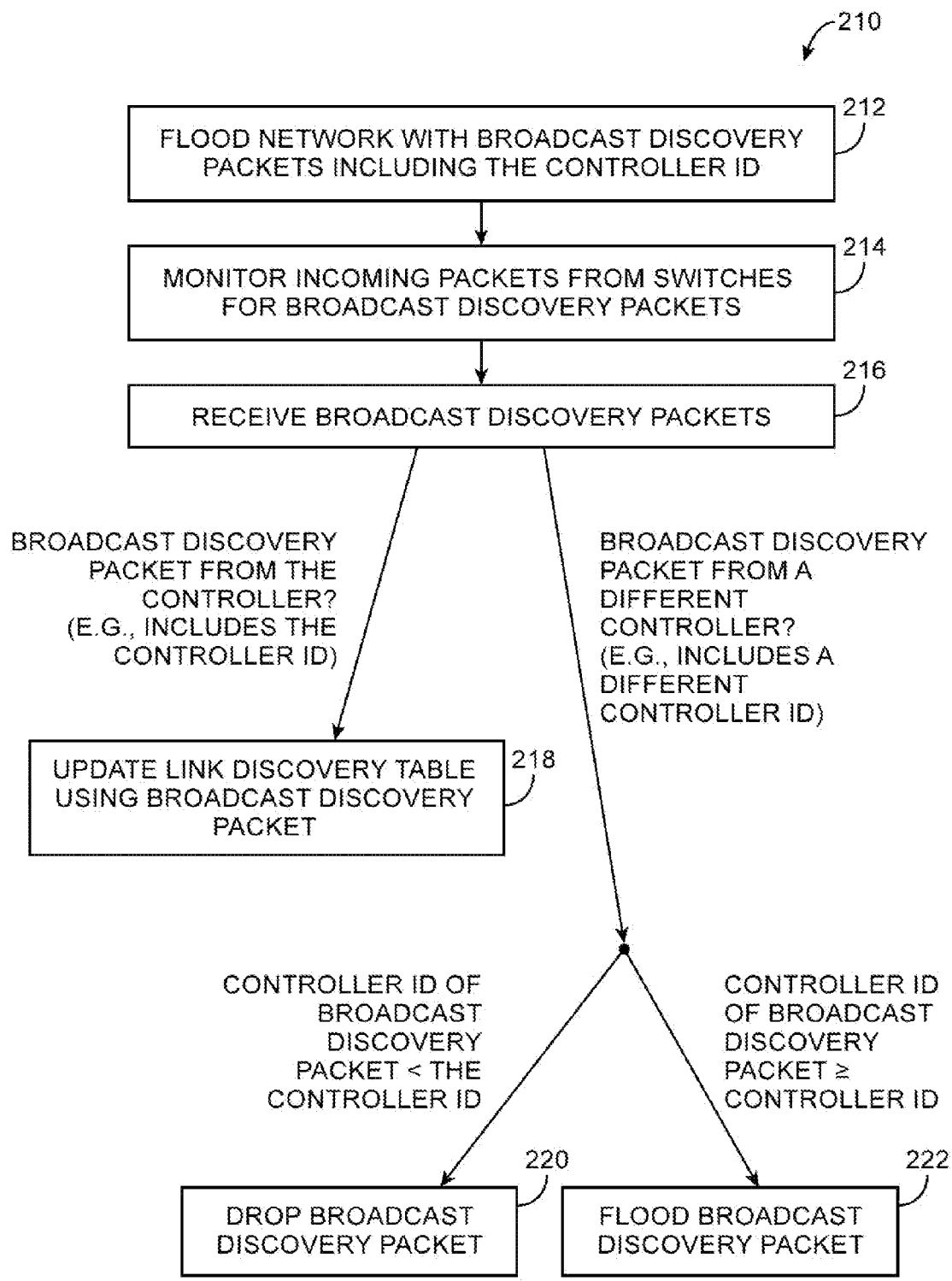
FIG. 17 is a flow chart of illustrative steps that may be performed by a controller to perform network discovery operations in networks including multiple controllers in accordance with an embodiment of the present invention.

FIG. 17 is a flow chart 210 of illustrative steps that may be performed by each controller 18 in a network such as controllers C1 and C2 of network 206 to accommodate network arrangements with multiple controllers. During step 212, controller 18 may flood the network with broadcast discovery packets including the ID of controller 18. Step 212 may, for example, be performed as part of step 191 of FIG. 15A.

During step 214, controller 18 may monitor incoming packets (e.g., packet in messages) from client switches for broadcast discovery packets (e.g., based on header fields such as an Ethertype header field of the incoming packets).

During step 216, controller 18 may receive and identify a broadcast discovery packet. Controller 18 may determine whether the broadcast discovery packet is from controller 18 or from a different controller based on the controller ID of the broadcast discovery packet (e.g., by matching the controller ID of the packet to the ID of controller 18). In response to determining that the broadcast discovery packet was generated by controller 18, the operations of step 218 may be performed to update a link discovery table (e.g., by performing steps 193-197 of flow chart 190 of FIG. 15A).

In response to determining that the broadcast discovery packet was generated by a different controller, controller 18 may determine whether the controller ID of the packet is less than or greater than the controller ID of controller 18. In response to determining that the controller ID of the packet is less than the controller ID, controller 18 may perform the operations of step 220 to drop the broadcast discovery packet. In response to determining that the controller ID of the packet is greater than or equal to the controller ID, controller 18 may perform the operations of step 222 to flood the broadcast discovery packet.

By flooding the broadcast discovery packet only when the controller ID of the packet is greater than the ID of controller 18, each controller may help to ensure that network forwarding operations are performed without forwarding loops and that network packets are forwarded correctly between client switches of different controllers. Consider the scenario in which controller C2 and controller C1 each send a broadcast discovery packet using link L1. In this scenario, the discovery packet sent by controller C1 may be received by controller C2 and dropped. Controller C1 may subsequently determine that links L1, L2, L3, and L4 are not connected by network portion 208. In contrast, the discovery packet sent by controller C2 may be received by controller C1 and flooded, which returns the discovery packet to controller C2 via links L2, L3, and L4. Controller C2 may therefore maintain information identifying that links L1, L2, L3, and L4 are interconnected by both network portions 207 and 208 (e.g., because controller C2 can separately collect network topology information from client switches of portion 208 that are controlled by controller C2). Controller C2 may subsequently select only one of links L1, L2, L3, and L4 for future flooding of packets (e.g., during normal forwarding operations between end hosts of network 206). Controller C1 may flood network packets using links L1, L2, L3, and L4. However, controller C2 may only allow network packets through the selected link, which helps to prevent formation of forwarding loops.

The example of FIG. 17 in which broadcast discovery packets are dropped only if the controller ID of the broadcast discovery packet is less than the ID of the controller is merely illustrative. If desired, the decision steps may be reversed so that step 220 is performed if the controller ID of the broadcast discovery packet is greater than the ID of the controller and so that step 222 is performed if the controller ID of the packet is less than the ID of the controller.

Figure 18:
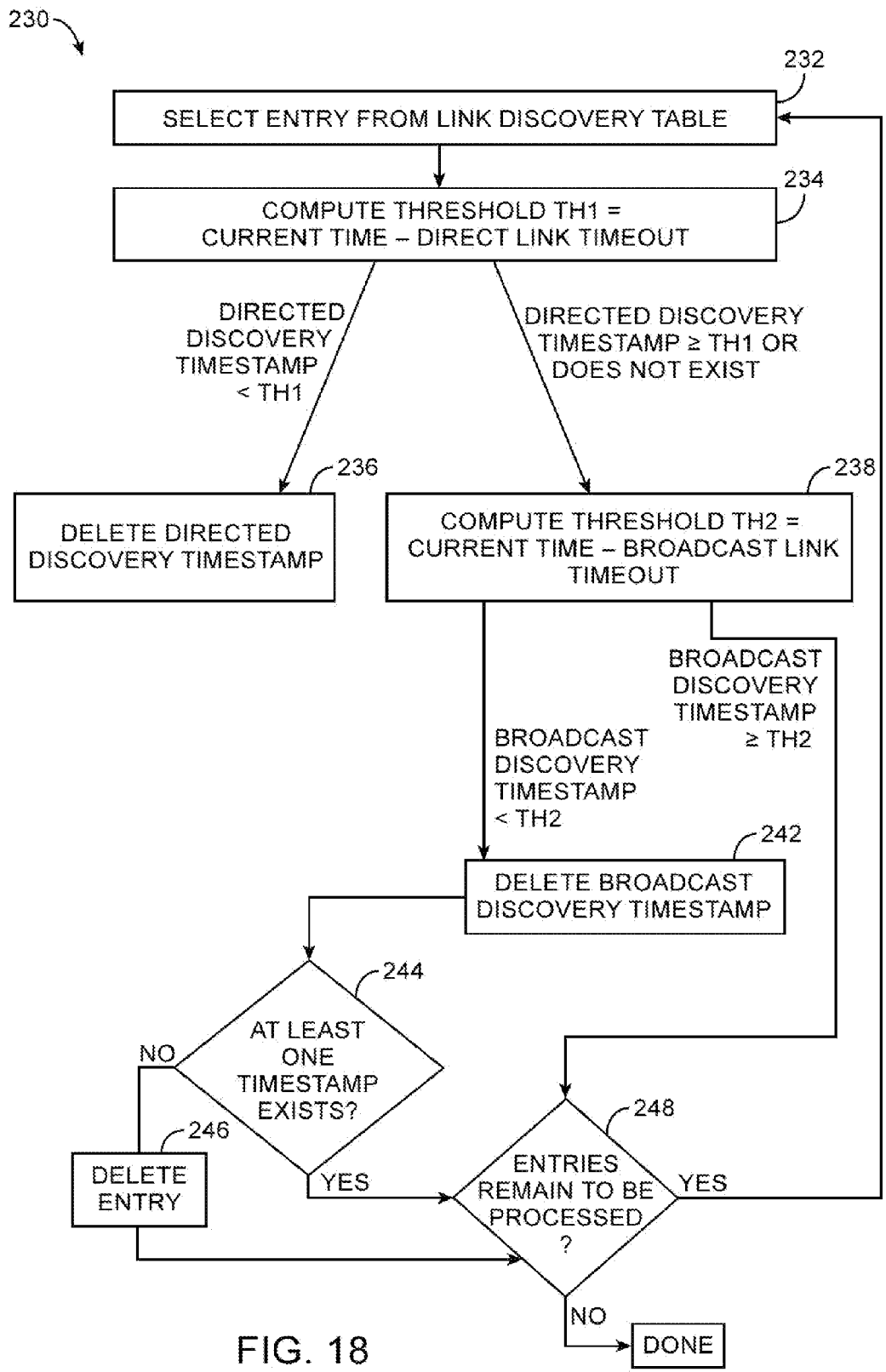
FIG. 18 is a flow chart of illustrative steps that may be performed to maintain a link discovery table in accordance with an embodiment of the present invention.

A network topology may change as switches are added and removed or as links are enabled or disabled between switches. Such network topology changes may result from physical network changes or from logical network changes (e.g., due to user configuration of switches). Controller 18 may periodically perform maintenance on link discovery table 180 to help ensure that the entries of table 180 contain current network topology information. FIG. 18 is a flow chart 230 of illustrative steps that may be performed by controller 18 to maintain link discovery table 180.

During step 232, controller 18 may select an entry 182 from link discovery table 180. Controller 18 may subsequently compute a first time threshold TH1 by subtracting a direct link timeout from the current time. The direct link timeout may be user-defined in the range of seconds, tens of seconds, or any desired amount of time. Controller 18 may compare the directed discovery packet timestamp (directed discovery timestamp) of the selected table entry to time threshold TH1. Time threshold TH1 may sometimes be referred to as a direct link timeout threshold. If the directed discovery packet timestamp indicates a time that is the same or after time threshold TH1 (i.e., if the directed discovery timestamp TH1) or if the directed discovery packet timestamp does not exist, the operations of step 238 may be performed. If the direct link timestamp occurs before the time threshold (i.e., if the directed discovery timestamp <TH1), the operations of step 236 may be performed.

During the operations of step 236, controller 18 may delete the directed discovery timestamp from the selected table entry. By deleting the directed discovery timestamp during step 236, controller 18 may help to ensure that network topology changes affecting direct links between client switches are updated within a time frame corresponding to the value of the direct link timeout. For example, controller 18 may periodically perform the operations of flow chart 190 of FIG. 15A to update link discovery table 180. If a direct link between client switches is blocked (e.g., via physical or logical configuration of the network), the timestamp of the corresponding entry may never be subsequently updated. In this scenario, the current time will eventually exceed the timestamp plus the direct link timeout value (i.e., the directed discovery timestamp <TH1) and the timestamp will be removed, which identifies that the link is no longer a direct link. The process may then proceed to step 238.

During step 238, controller 18 may compute a second time threshold TH2 as a broadcast link timeout value subtracted from the current time (i.e., TH2=current time−broadcast link timeout). Time threshold TH2 may sometimes be referred to herein as a broadcast link timeout threshold. Controller 18 may compare broadcast link timeout threshold TH2 to the broadcast discovery timestamp of the selected table entry. In response to determining that the broadcast discovery timestamp occurs before time threshold TH2 (e.g., broadcast discovery timestamp <time threshold TH2), the operations of step 242 may be performed. In response to determining that the broadcast discovery timestamp occurs at or after time threshold TH2 (e.g., broadcast discovery timestamp ≥TH2), the operations of step 248 may be performed.

During step 242, controller 18 may delete the broadcast discovery timestamp from the selected entry. Use of the broadcast link timeout may provide a valid window for the broadcast discovery timestamp similarly to the window for the directed discovery timestamp (e.g., when the current time passes the valid window as defined by the broadcast link timeout, the broadcast link timestamp may be deleted during the next maintenance process performed by controller 18).

During step 244, controller 18 may determine whether at least one timestamp (e.g., direct or broadcast) exists in the selected entry. If no timestamp exists, the entire entry may be deleted during step 246, because the link may no longer exist. If at least one timestamp exists, the operations of step 248 may be performed.

During step 248, controller 18 may determine whether entries in the link discovery table remain to be processed. If entries remain to be processed, the process may return to step 232 to perform maintenance on the remaining entries. If all entries have been processed, the maintenance operations of flow chart 230 may be finished.

Figure 19:
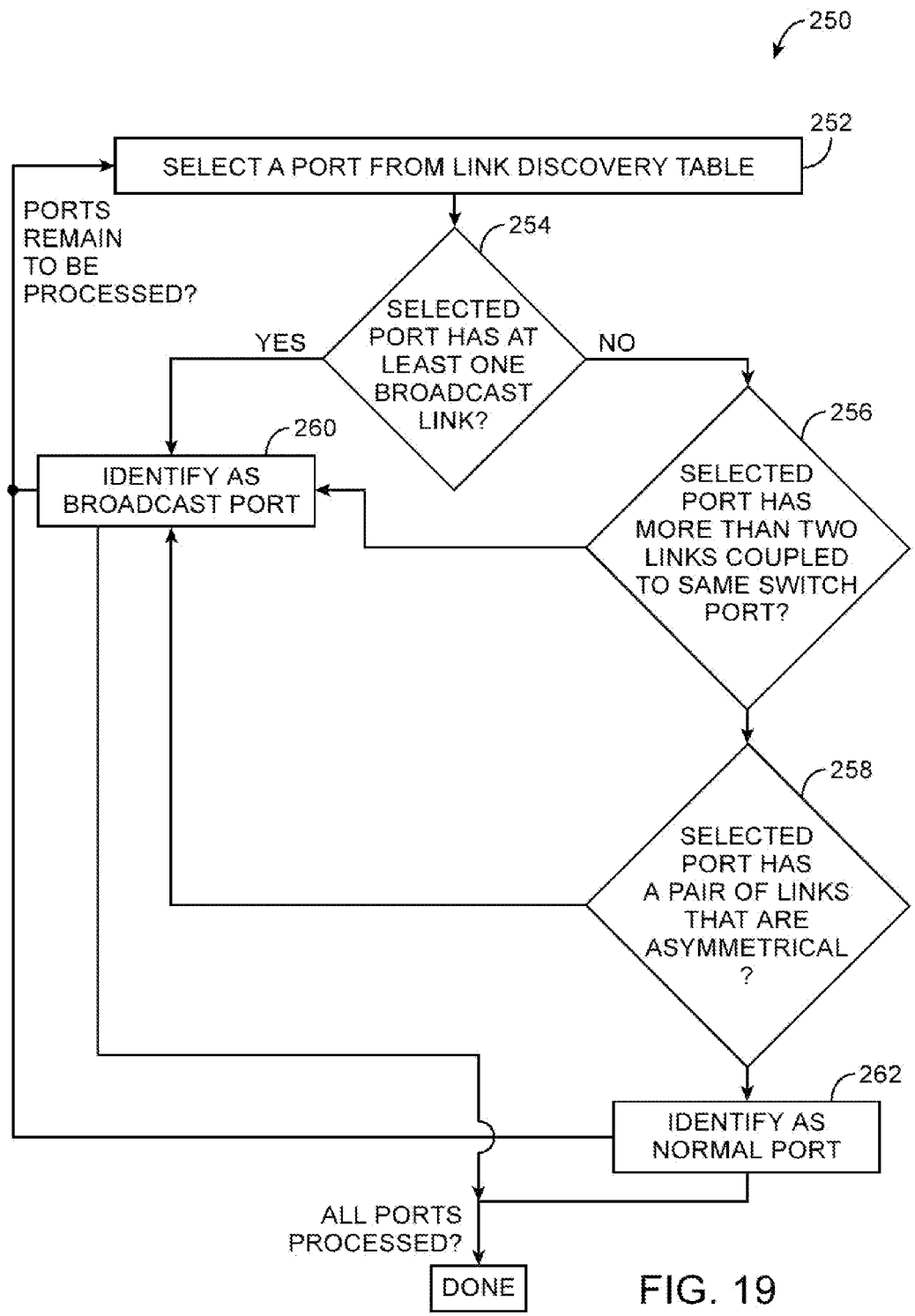
FIG. 19 is a flow chart of illustrative steps that may be performed by a controller to classify switch ports of a network based on classified link information in accordance with an embodiment of the present invention.

Controller 18 may classify client switch ports as broadcast or normal ports using link discovery table 180. The classification of client switch ports may subsequently be used to identify broadcast domains and client domains. FIG. 19 is flow chart of illustrative steps that may be performed by controller 18 to classify client switch ports using link discovery table 180.

During step 252, controller 18 may select a switch port from the link discovery table. The port may be selected from the links of table entries 182. For example, port P1 of switch SW1 or port P1 of switch SW2 may be selected from the first entry of table 180 of FIG. 14.

During step 254, controller 18 may determine whether the selected port has at least one associated broadcast link. For example, controller 18 may identify each link of link discovery table 180 that includes the selected port as either a source or destination port of the link. If at least one of the identified links is marked as a broadcast link in the link discovery table, the port may be identified as a broadcast port during step 260. In other words, a port that is associated with any broadcast links may be identified as a broadcast port. If no links are marked as broadcast links in the link discovery table, the operations of step 256 may be performed.

During step 256, controller 18 may determine whether the selected port is associated with more than two links that are coupled to the same switch port (e.g., the selected port is associated with at least three links coupled to the same switch port). A port that is associated with more than two links may represent ports associated with broadcast domains and controller 18 may identify the selected port as a broadcast port during step 260 in response to determining that the selected port is associated with more than two links. In response to determining that the port is associated with two or fewer (e.g., less than three) ports, the operations of step 258 may be performed.

During step 258, controller 18 may determine whether the selected port has a pair of links that are not symmetrical (i.e., asymmetrical). First and second links are symmetrical if the source switch port of the first link is the same as the destination switch port of the second link and the destination switch port of the first link is the same as the source switch port of the second link (i.e., the first link is in the reverse direction of the second link). In response to determining that the selected port has a pair of associated links that are asymmetrical, controller 18 may identify the selected port as a broadcast port during step 260. In response to determining that no pairs of links associated with the selected port in the discovery table are asymmetrical, controller 18 may identify the selected port as a normal port during step 262. Normal client switch ports may be directly connected to other client switch ports and may. As an example, a first client switch port may have a pair of symmetrical links that connect the client switch port to a second client switch port in forward and reverse directions. As another example, a first client switch port may have a single link that connects the client switch port to a second client switch port. In these scenarios, the first and second client switch ports may identified as normal ports.

Consider the scenario in which non-client switches in a broadcast domain that are not controlled by controller 18 may unexpectedly flood the broadcast domain with a direct discovery packet that was sent from a client switch port. In this scenario, links associated with the client switch port may be classified as direct links due to the behavior of the non-client switches even though the client switch port is coupled to a broadcast domain. The operations of steps 256 and 258 may help to ensure that client switch ports coupled to broadcast domains are correctly identified as broadcast ports (e.g., because a client switch port that is directly connected to another client switch port would not have three or more associated links and would not have any pairs of asymmetrical links).

During steps 260 and 262, controller 18 may determine whether ports in the link discovery table remain to be processed. In response to determining that ports remain to be processed, the process may subsequently return to step 252 to process the remaining ports. In response to determining that all ports have been processed, the operations of flow chart 250 may be complete.

Figure 20:
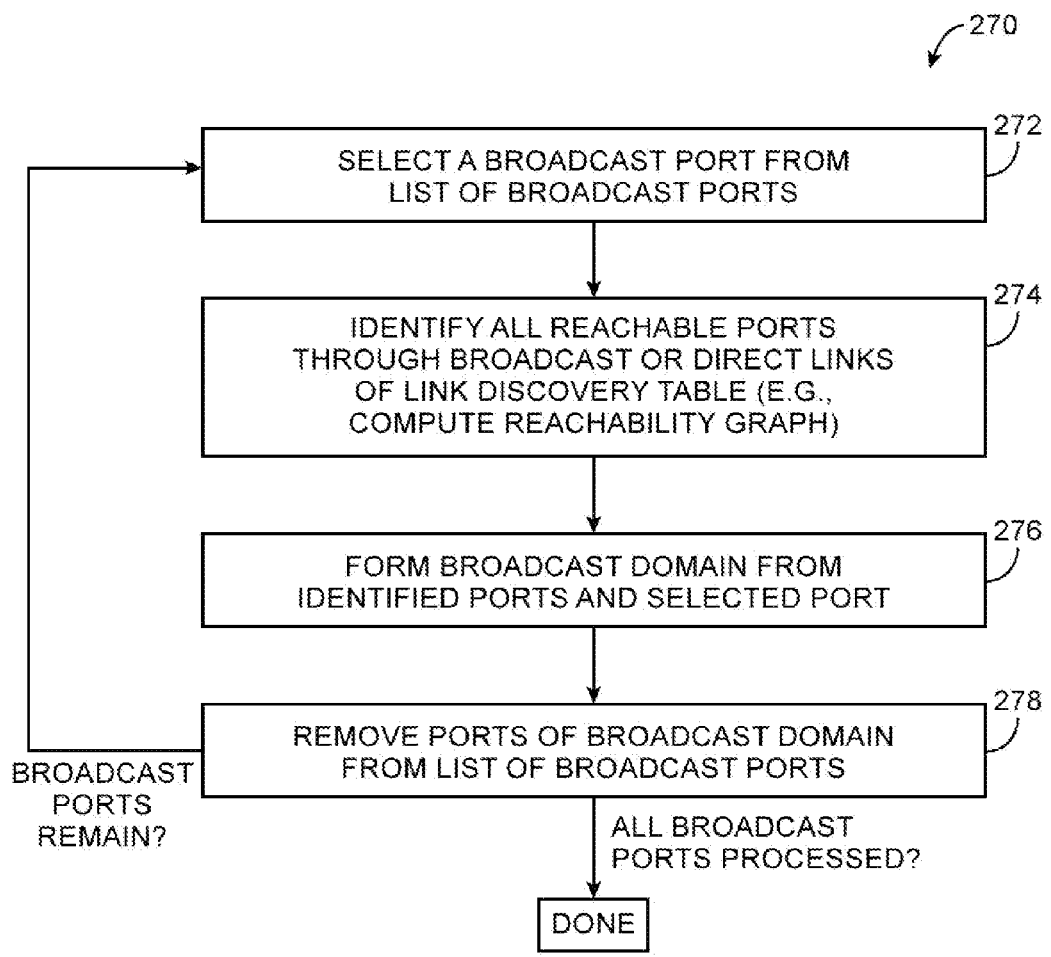
FIG. 20 is a flow chart of illustrative steps that may be performed by a controller to identify non-client domains based on classified switch port information in accordance with an embodiment of the present invention.

The broadcast ports identified, for example, during the steps of flow chart 250 may be organized by controller 18 into a list of broadcast ports. This example is merely illustrative. If desired, identified broadcast ports may be organized into any suitable arrangement such as a list, database, or other arrangement. Controller 18 may use the list of broadcast ports to identify broadcast domains as shown by flow chart 270 of FIG. 20.

During step 272, controller 18 may select a broadcast port from the list of broadcast ports. During subsequent step 274, controller 18 may identify all network reachable ports that are coupled to the broadcast port via links of link discovery table 180. For example, controller 18 may compute a reachability graph using the selected broadcast port that identifies each port (broadcast or normal) that is coupled to the selected broadcast port via broadcast or direct links of the link discovery table.

During step 276, controller 18 may group the identified ports and the selected port to form a broadcast domain. By identifying the broadcast domain from all ports that are coupled to the selected broadcast port regardless of whether the reachable ports are broadcast or direct, controller 18 may help to ensure that all ports associated with a broadcast domain are correctly identified.

During step 278, controller 18 may remove the ports of the broadcast domain from the list of broadcast ports. In other words, the broadcast ports identified as part of the broadcast domain may be removed from the available pool of broadcast ports to be selected, which helps to avoid duplicative broadcast domains from being formed (e.g., broadcast domains that share broadcast ports). If broadcast ports of the list of broadcast ports remain to be processed, the process may subsequently return to step 272. If all broadcast ports of the list have been processed, the operations of flow chart 270 may be complete.

Figure 21:
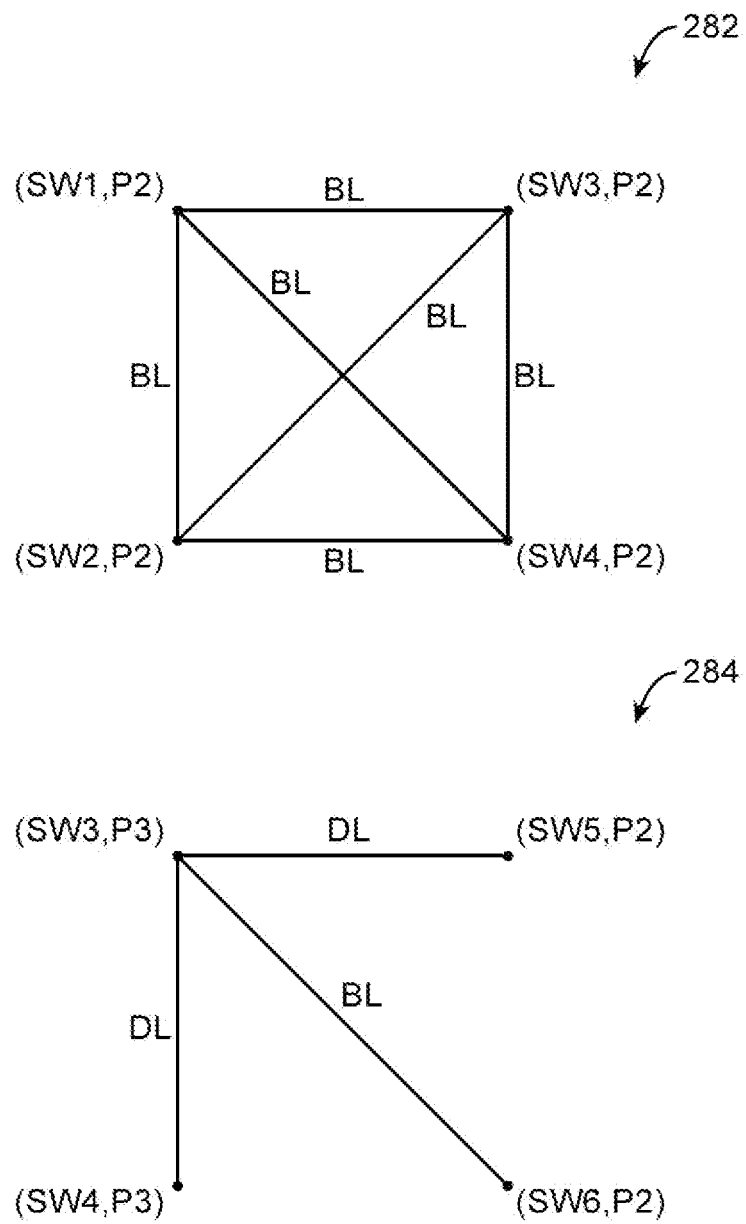
FIG. 21 is a diagram of illustrative non-client domains that may be identified for the network of FIG. 8 in accordance with an embodiment of the present invention.

FIG. 21 is an illustrative diagram of reachability graphs that may be generated from a list of broadcast ports. In the example of FIG. 21, the list of broadcast ports may be identified from network 100 of FIG. 8 (e.g., by performing the operations of flow charts 190, 198, and 250 of FIGS. 15A, 15B, and 19). Reachability graph 282 may be computed from a broadcast port such as broadcast port P1 of client switch SW1 during step 274 of flow chart 270 of FIG. 20. As shown by reachability graph 282, each of port P2 of switch SW1, port P2 of switch SW2, port P2 of switch SW3, and port P2 of switch SW4 may be connected by a broadcast link (BL) in the link discovery table. The client switch ports of reachability graph 282 may be used to represent broadcast domain BD1 of FIG. 8 (e.g., as shown in FIG. 9B).

In some scenarios, unexpected operation of non-client switches such as non-client switch SW8 of broadcast domain BD2 (FIG. 8) may cause controller 18 to be unable to identify some links and may cause controller 18 to incorrectly identify some links as direct links. In the example of graph 284, the connection between port P3 of switch SW3 and port P2 of switch SW5 and the connection between port P3 of switch SW3 and port P3 of switch SW4 may be labeled as direct links. Some connections, such as between port P2 of switch SW5 and port P2 of switch SW6 may remain unidentified. Ports P2 of switch SW5 and P3 of switch SW4 may be identified as normal ports due to the unexpected operation of non-client switch SW8 (see, e.g., steps 254-262 of FIG. 19). However, port P3 of switch SW3 and port P2 of switch SW6 may be correctly identified as broadcast ports, because a broadcast link exists that connects port P3 of switch SW3 to port P2 of switch SW6. In this scenario, ports P2 of SW5 and P3 of SW4 may still be correctly identified as being a part of broadcast domain BD2 even though those ports are not included in any broadcast links and are labeled as normal ports, because broadcast port P2 of switch SW1 is linked to the two normal ports.

In general, if a sufficient number of broadcast ports are correctly identified such that the correctly identified broadcast ports are linked via entries of the link discovery table to the remaining (e.g., incorrectly identified) ports of a broadcast domain, the ports of the broadcast domain may still be correctly associated with the broadcast domain by performing the steps of flow chart 270.

Figure 22:
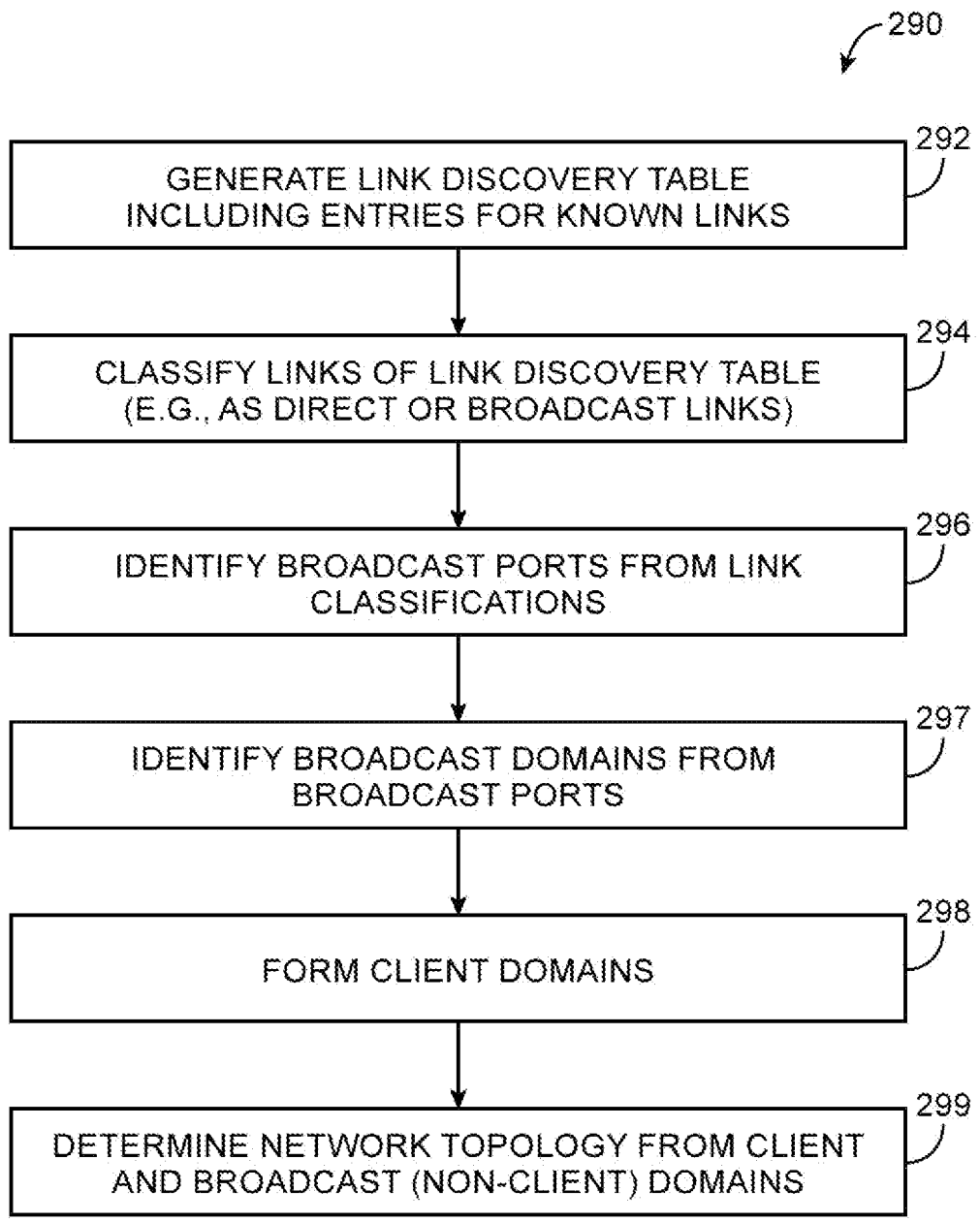
FIG. 22 is a flow chart of illustrative steps that may be performed to determine a network topology using a link discovery table in accordance with an embodiment of the present invention.

FIG. 22 is a high-level flow chart 290 of illustrative steps that may be performed by controller 18 to determine a network topology using a link discovery table. During step 292, controller 18 may generate a link discovery table (e.g., by performing the steps of flow chart 190 of FIG. 15A). The operations of flow chart 210 may be performed to accommodate network arrangements having multiple controllers. The link discovery table may be maintained by performing the steps of flow chart 230 of FIG. 18.

During step 294, controller 18 may classify the links of the link discovery table as direct or broadcast links (e.g., by performing the steps of flow chart 198 of FIG. 15B). During subsequent step 296, controller 18 may identify broadcast ports based on the link classifications of step 294 (e.g., by performing the steps of flow chart 250 of FIG. 19). During step 297, controller 18 may then identify broadcast domains from the broadcast ports (e.g., by performing the steps of flow chart 270 of FIG. 20). During step 298, controller 18 may form client domains by grouping client switches that are directly connected (e.g., each client switch in a client domain may be coupled to each other client switch in the client domain without any intervening non-client switches). Subsequently, during step 299, controller 18 may determine the network topology from the client and non-client broadcast domains including connections between the client and non-client domains.

Figure 23:
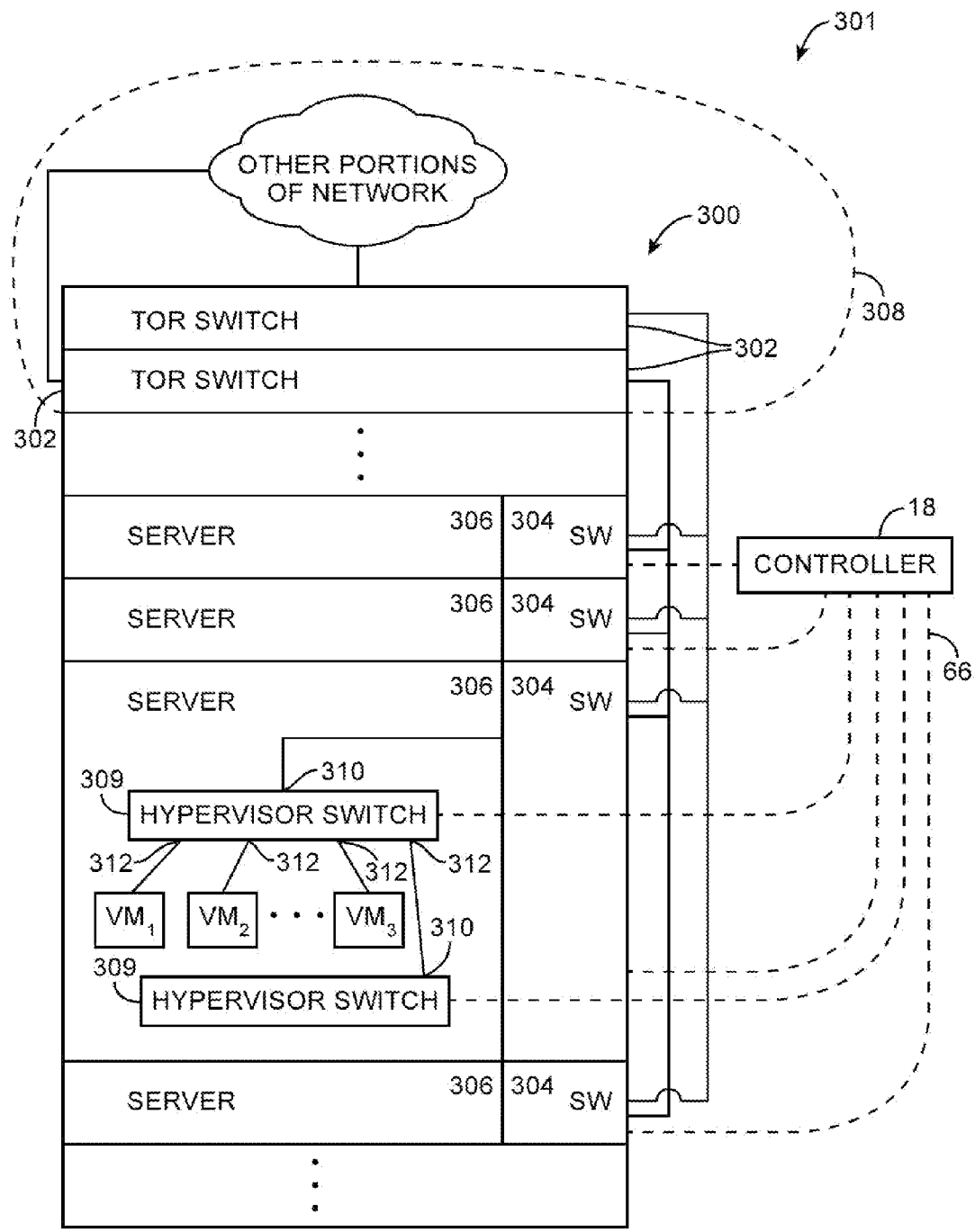
FIG. 23 is a diagram of an illustrative network including a rack-based system in accordance with an embodiment of the present invention.

In some scenarios, controller 18 may be used to control switches of a rack-based system such as shown in FIG. 23. Rack-based system 300 of FIG. 23 may include multiple servers 306 (or other computing equipment) arranged in a rack structure. Servers 306 may, for example, serve as end hosts in network 301 and may communicate with other servers or other end hosts in the network. Each server 306 may be associated with a corresponding switch 304. For example, each server 306 may include multiple portions (e.g., portions of computing equipment) that are coupled to the corresponding switch 304 via switch ports (not shown).

Rack-based system 300 may include so-called top-of-rack (TOR) switches 302 that serve to convey traffic between switches 304 and other portions of network 301. In other words, TOR switches 302 may interface between system 300 and other portions of network 301. For example, network 301 may include multiple rack-based systems that are connected via TOR switches 302. As another example, other networks or other portions of the network may be connected to servers 306 and switches 304 via TOR switches 302. In general, there are somewhat fewer TOR switches 302 in rack-based system 300 than switches 304. For example, in a typical rack-based system 300, a few (e.g., two, three, four, etc.) TOR switches may serve as centralized forwarding nodes for tens of switches 304 and servers 306 (e.g., twenty, thirty, forty, fifty, or more switches 304).

Servers 306 may be used to implement virtual switches such as hypervisor switches 309. A virtual switch may be implemented using computing resources of a server 306 and may be coupled to other switches and virtual end hosts via virtual ports 310 and 312. For example, a first hypervisor switch 309 may include ports 312 that are coupled to a second hypervisor switch 309 and to virtual machines (end hosts) VM1, VM2, and VM3 that are implemented using computing resources of server 306. In the example of FIG. 23, switches 304 and 309 may be client switches that are controlled by controller 18 via paths 66, whereas TOR switches 302 may be non-client switches that form a broadcast domain 308. It can be challenging for controller 18 to manage network topology discovery (e.g., identification of broadcast domain 308), because each non-client switch 302 may be coupled to tens of client switches 304. Consider the scenario in which 40 client switches 304 are coupled to each non-client switch 302. Controller 18 may direct client switches 304 to send broadcast discovery packets during step 191 of flow chart 190 (FIG. 15A). In this scenario, a non-client switch 302 may receive 40 broadcast discovery packets and forward the broadcast packets to each of the client switches 304 (e.g., flooding the network). The client switches 304 may subsequently forward the flooded broadcast discovery packets to controller 18 for processing, which can cause excessive load at controller 18 (e.g., the 40 broadcast discovery packets originally sent may generate up to 40*39 flooded broadcast discovery packets for processing at controller 18).

Figure 24:
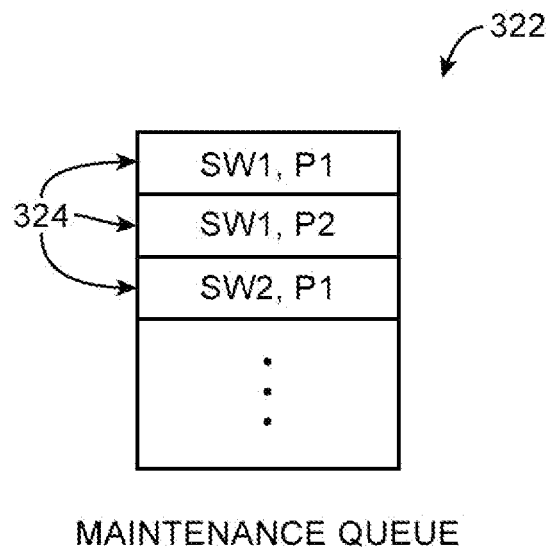
FIG. 24 is a diagram of an illustrative maintenance queue that may be maintained by a controller to control the rate of network discovery operations in accordance with an embodiment of the present invention.

Controller 18 may manage network discovery by maintaining lists of ports to be processed for network discovery (e.g., by sending discovery packets from the ports of the lists). FIG. 24 is a diagram of an illustrative maintenance queue 322 that may be maintained by controller 18. Maintenance queue 322 may include entries 324 that each identifies a respective port to be processed (e.g., port P1 of switch SW1). Controller 18 may periodically process one or more entries 324 and remove the processed ports from queue 322. For example, controller 18 may process K entries every T units of time. The rate at which controller 18 process entries 324 may be selected to accommodate the processing capabilities of controller 18. For example, controller 18 may be capable of processing 5 entries every 100 milliseconds (i.e., K=5 and T=100 milliseconds).

Figure 25:
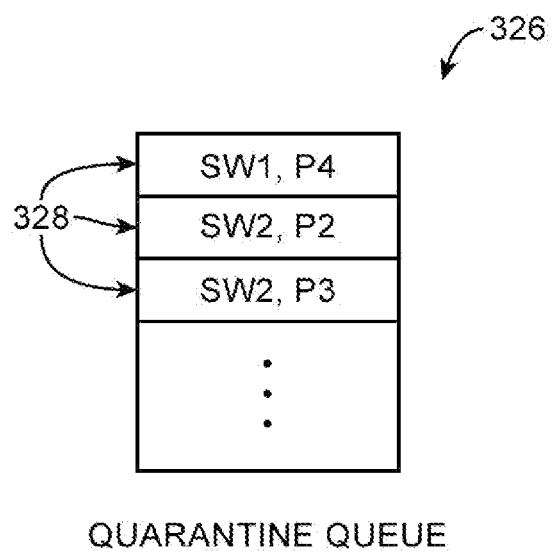
FIG. 25 is a diagram of an illustrative quarantine queue that may be maintained by a controller to minimize undesired network traffic during initial network discovery operations in accordance with an embodiment of the present invention.

During network discovery operations, controller 18 may be configured to block network traffic until broadcast domains have been discovered. FIG. 25 is a diagram of an illustrative quarantine queue 326 that may be maintained by controller 18 during initial network discovery operations. Controller 18 may block network traffic received at ports of entries 328 of quarantine queue 326. Controller 18 may allow network traffic that is associated with network discovery operations. For example, controller 18 may provide flow table entries to the switches that allow network discovery traffic while blocking all other network traffic (e.g., normal network traffic between end hosts of the network). To perform initial network discovery operations, entries 328 may be processed similarly to entries 324 of maintenance queue 322 (e.g., K entries may be processed every T units of time). Entries 328 of quarantine queue 326 may be removed from quarantine queue as the entries are processed to enable network traffic flow through the ports of the entries.

In some scenarios, client switches may provide information to controller 18 that identifies whether ports of the client switches should be used in network discovery operations. For example, a hypervisor switch 309 of FIG. 23 may identify to controller 18 that ports 312 should not be used in broadcast network discovery operations (e.g., because ports 312 are typically connected to virtual end hosts), whereas port 310 should be used in broadcast network discovery operations. Hypervisor switch 309 may flag ports 312 as "fast ports" that should not be used for broadcast network discovery operations, whereas port 310 may be identified without a flag.

Figure 26:
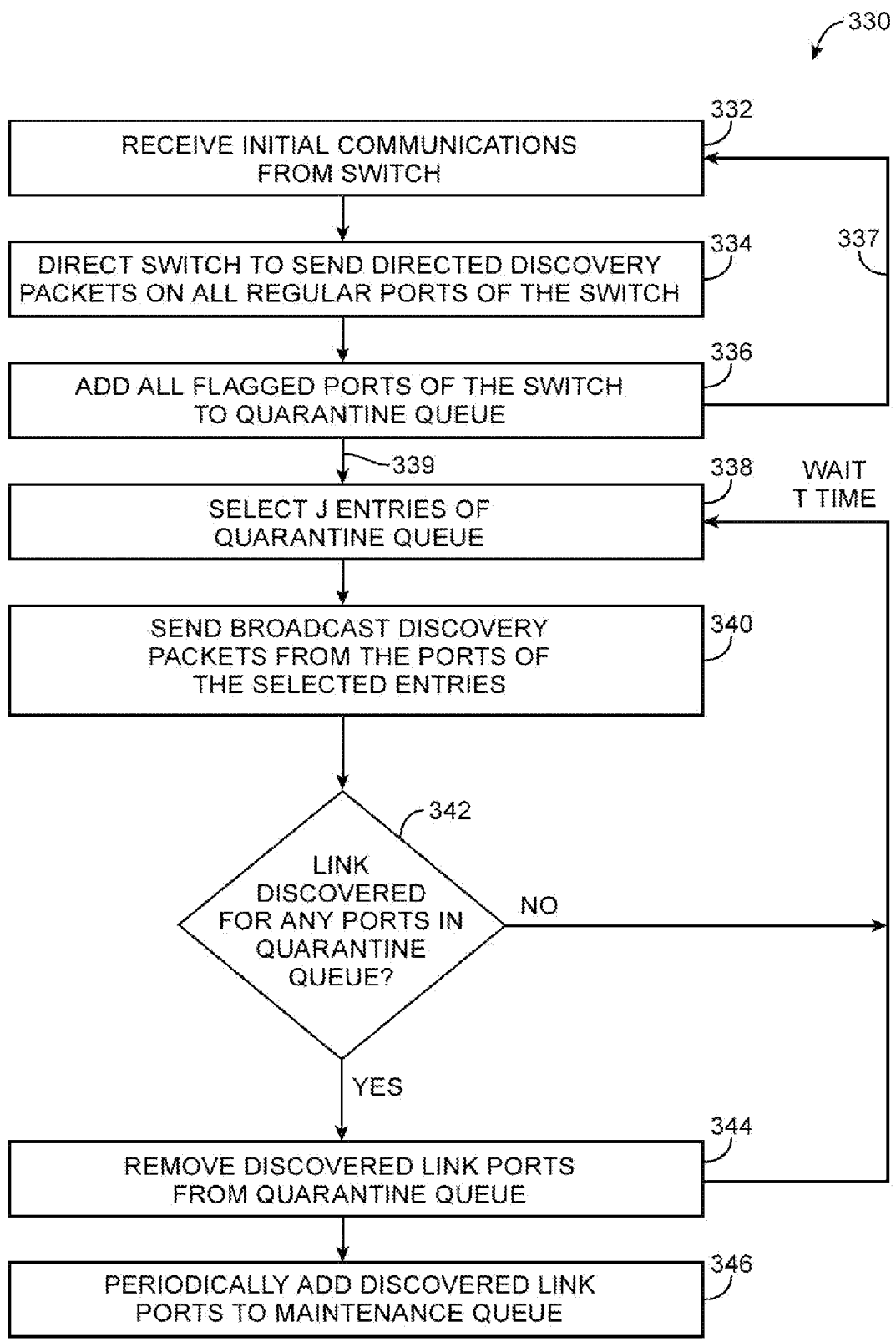
FIG. 26 is a flow chart of illustrative steps that may be performed to perform initial network discovery operations on ports of client switches in accordance with an embodiment of the present invention.

FIG. 26 is a flow chart 330 of illustrative steps that may be performed by controller 18 for network discovery using maintenance queue 322 and quarantine queue 326.

During step 332, controller 18 may receive initial communications from a client switch such as switches 304 and 309 of FIG. 23. The client switch communications may include a list of ports of the client switch and corresponding flags. For example, a client switch may send a communications message to controller 18 via control paths 66 upon power-up of the client switch.

During step 334, controller 18 may direct the client switch to send direct discovery packets on all regular ports (e.g., non-flagged ports) of the switch. The direct discovery packets may be initially sent because regular ports typically are not flooded and therefore do not generate excessive amounts of network discovery traffic.

During step 336, controller 18 may add all flagged ports of the switch to quarantine queue 326. Controller 18 may subsequently perform the operations of steps 332 and/or 338. For example, controller 18 may proceed to steps 332 and 338 via paths 337 and 339 to simultaneously process entries of the quarantine queue and add entries for ports from new client switches. As another example, controller 18 may continue returning to step 332 until all new switches have been processed and subsequently proceed to step 338 to process the quarantine queue.

During step 338, controller 18 may select J entries of the quarantine queue for processing. During subsequent step 340, controller 18 may direct the switches associated with the selected entries to send broadcast discovery packets from the ports of the selected entries. The broadcast discovery packets sent during step 340 and the directed discovery packets sent during step 334 may be received and forwarded to controller 18 by client switches. Controller 18 may process the forwarded discovery packets by performing steps substantially similar to the steps of flow charts 190 (FIG. 15A), 198 (FIG. 15B), 250 (FIG. 19), and 270 (FIG. 20) to identify and classify network links and identify broadcast domains from the classified network links.

During step 342, controller 18 may determine whether any links have been discovered for any ports in the quarantine queue. For example, a link discovery table entry generated during step 196 of flow chart 190 (FIG. 15A) may be compared to each entry of the quarantine queue to determine whether the source or destination switch ports of the link discovery table entry match the switch port of that quarantine queue entry. If a match is found, the matching quarantine queue entry may be removed from the quarantine queue during step 344 to allow network traffic through the link of the removed entry. If no matching quarantine queue entry is found, the process may return to step 338 after a delay of time T to process remaining entries of the quarantine queue. Similarly, the process may return to step 338 subsequent to step 344 after a delay of time T. Time T may be selected based on the processing capabilities of controller 18.

Controller 18 may periodically add discovered link ports to maintenance queue 322 during step 346. The example of FIG. 26 in which step 346 is performed subsequently to step 344 is merely illustrative. Step 344 may be performed separately and simultaneously with the steps of flow chart 330 to periodically add discovered link ports for network topology maintenance.

Figure 27:
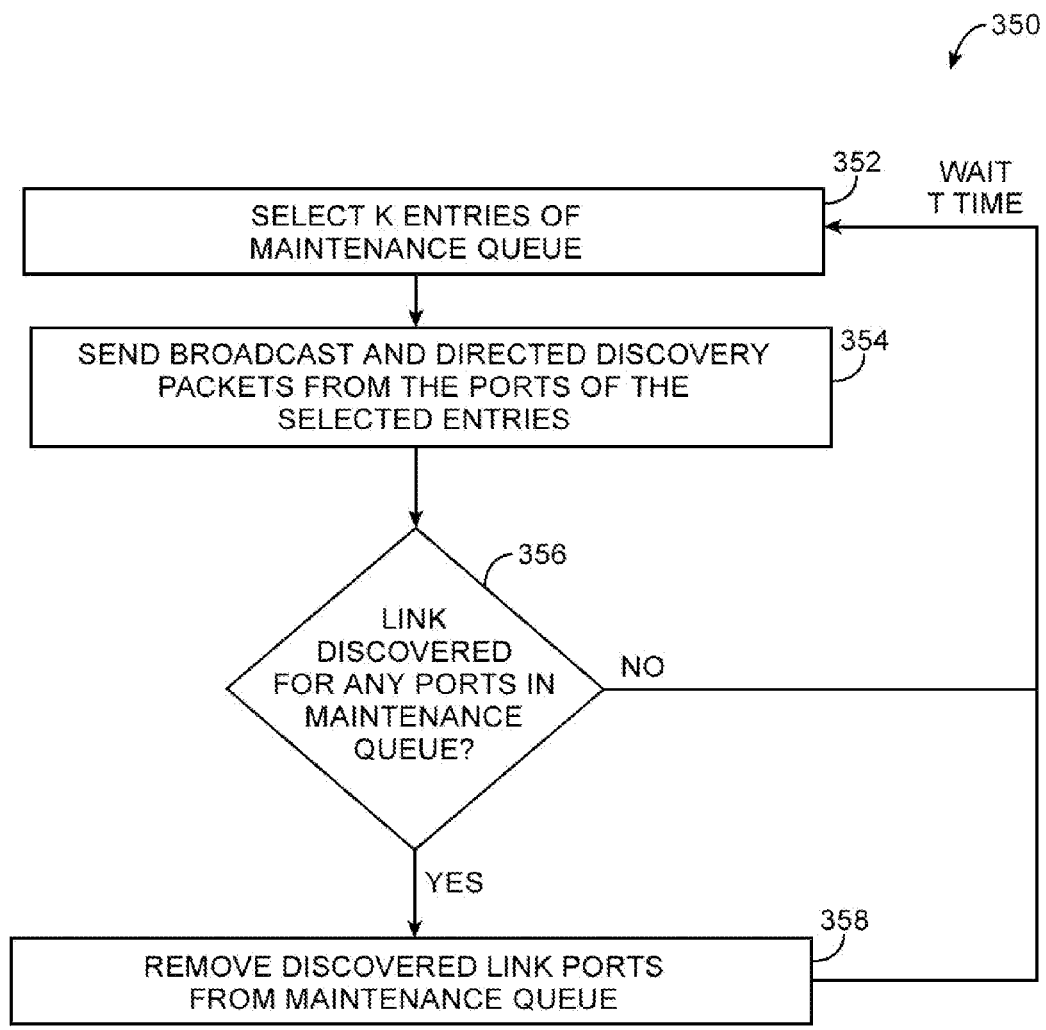
FIG. 27 is a flow chart of illustrative steps that may be performed to process entries of a maintenance queue in accordance with an embodiment of the present invention.

Maintenance queue 322 may be processed similarly to quarantine queue 326 as shown by flow chart 350 of FIG. 27. Steps 352-358 may be performed similarly to steps 338-344 of flow chart 330 to periodically select and process entries of the maintenance queue to determine network topology information. In addition, during step 354, directed discovery packets such as LLDP packets may be sent from the ports of the entries selected during step 352. Maintenance queue 322 may be processed at a rate equal to or different from the rate at which quarantine queue 326 is processed. For example, K may be equal to J so that the number of entries selected for processing during step 352 is equal to the number of entries selected during step 338.

For some network arrangements, client switch ports that are flagged as not requiring network discovery may be coupled to other client switch ports. Consider the scenario of FIG. 23 in which a first hypervisor switch 309 includes a port 312 that is coupled to a port 310 of a second hypervisor switch 309. In this scenario, port 312 of the first switch may be flagged even though port 312 is coupled to the second switch and network discovery operations would be required to discovery the link from port 312 of the first switch to port 310 of the second switch.

Figure 28:
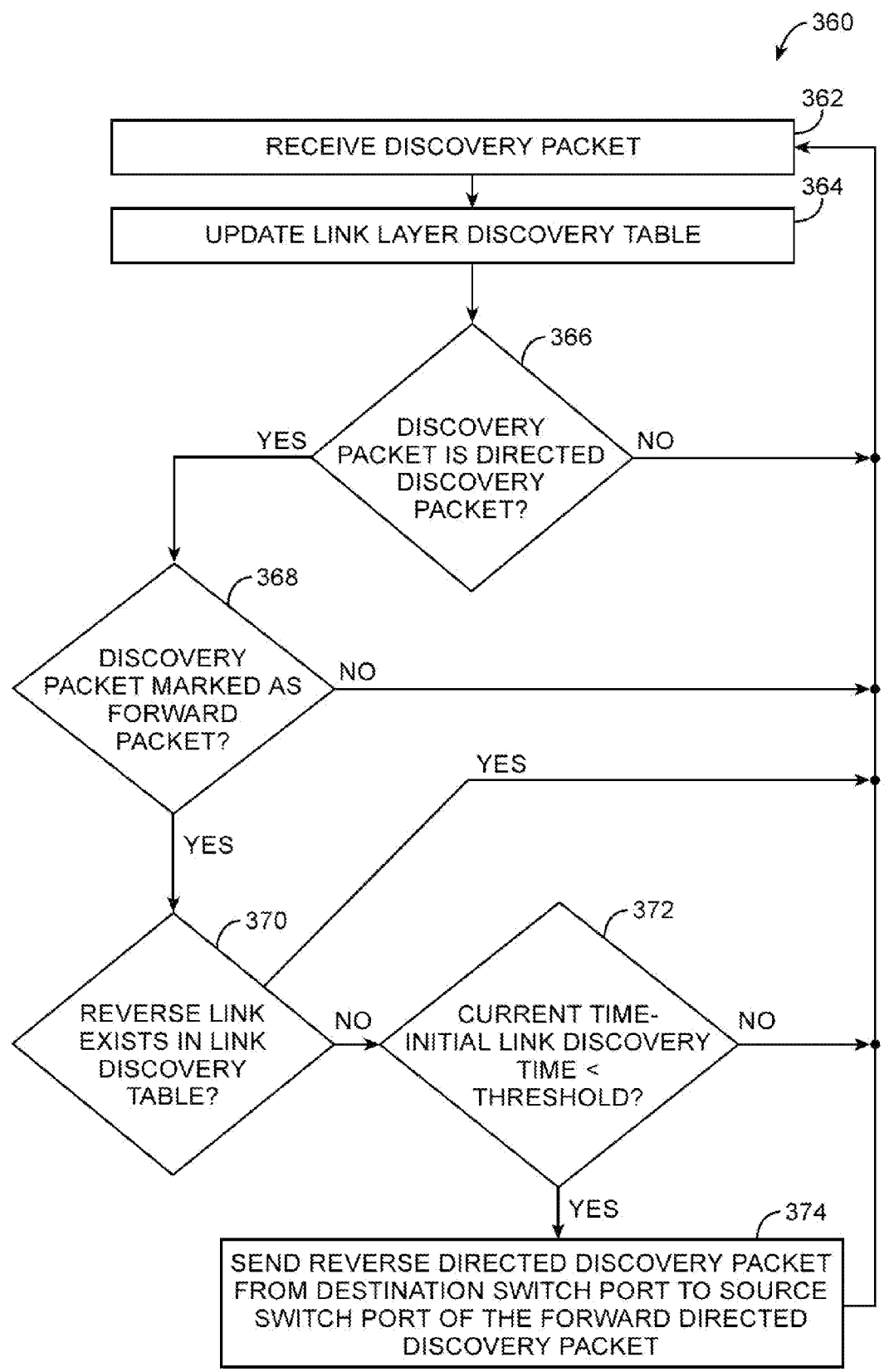
FIG. 28 is a flow chart of illustrative steps that may be performed to help ensure timely discovery of network topology for new switches in accordance with an embodiment of the present invention.

FIG. 28 is a flow chart 360 of illustrative steps that may be performed by controller 18 to help ensure that links in a network are identified during network discovery operations. The operations of FIG. 28 may be performed in conjunction with the steps of flow chart 190 of FIG. 15A, flow chart 330 of FIG. 26, or other network discovery operations. Directed discovery packets that are sent, for example, during step 334 of flow chart 330 or step 191 of flow chart 190, may be marked as forward packets (e.g., controller 18 may store a forward identifier in a corresponding header field of LLDP messages).

During step 362, controller 18 may receive a discovery packet (e.g., a direct discovery packet or a broadcast discovery packet that was forwarded to controller 18 by a client switch). The discovery packet may, for example, be received during step 192 of FIG. 15A. During step 364, controller 18 may update a link layer discovery table (e.g., during step 197 of FIG. 15A). Controller 18 may determine whether the discovery packet is a directed discovery packet (e.g., as part of step 194 of FIG. 15A). In response to determining that the discovery packet is a directed discovery packet, the operations of step 368 may be performed. In response to determining that the discovery packet is not a directed discovery packet (e.g., the discovery packet is a broadcast discovery packet), the process may return to step 362 to process additional discovery packets.

During step 368, controller 18 may determine whether the discovery packet is marked as a forward packet (e.g., whether the discovery packet was sent during step 334 of flow chart 190 or step 192 of flow chart 330). Forward packets may have been sent between regular client switch ports such as ports of switches 304, ports 310 of virtual switches 309 or other ports that have not been flagged as not requiring network discovery operations. If the discovery packet is marked as a forward packet, the operations of step 370 may be performed. If the discovery packet is not marked as a forward packet (e.g., marked as a reverse packet), the process may return to step 362.

The discovery packet may be used to generate a link entry (e.g., during step 196 of flow chart 190 of FIG. 15A). The link entry may identify a directional link from a source client switch port to a destination client switch port. During step 370, controller 18 may determine whether a reverse link (reverse directional link) for the identified directional link exists in the link discovery table. For example, the source and destination switch ports of the identified directional link may be swapped to identify the reverse directional link. If the reverse directional link does not exist in the link discovery table, the operations of step 372 may be performed. If the reverse directional link already exists in the link discovery table, the process may return to step 362.

During step 372, controller 18 may determine whether the initial link discovery time subtracted from the current time exceeds a threshold time (e.g., one millisecond, five milliseconds, 10 milliseconds, seconds, or any desired threshold time). The initial link discovery time may be obtained from the link discovery table. If the time difference between the initial link discovery time and the current time is less than the threshold time, the operations of step 374 may be performed. If the time difference exceeds the threshold time, the process may return to step 362. By ensuring that the time difference is less than a threshold, controller 18 may help to prevent scenarios in which an excessive number of reverse directed discovery packets are continually sent (e.g., during step 374).

During step 374, controller 18 may send a reverse directed discovery packet. The reverse directed discovery packet may be sent from the destination switch port to the source switch port of the forward directed discovery packet initially received during step 362 (i.e., in the reverse direction). The reverse directed discovery packet may be forwarded to controller 18 by client switches and may be used to identify links between flagged ports of client switches. The process may then return to step 362 to process additional discovery packets.

Figure 29:
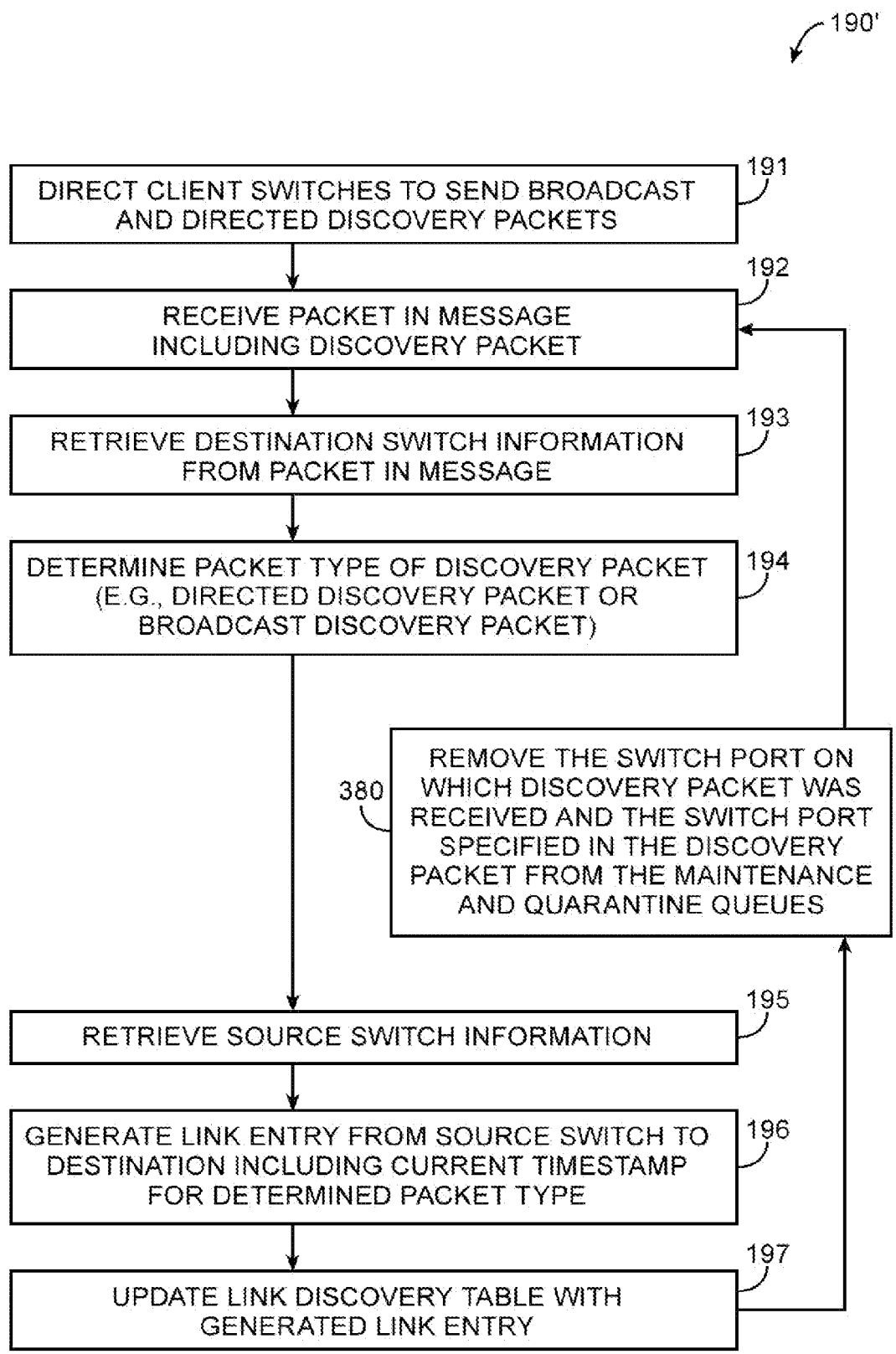

Controller 18 may perform a modified process of maintaining a link discovery table in scenarios such as when maintenance and/or quarantine queues are maintained by the controller. FIG. 29 is a flow chart 190' of illustrative steps that may be performed by controller 18 to generate and maintain a link discovery table with maintenance and quarantine queues. Steps 191-197 may be substantially similar to steps 191-197 of FIG. 15A. Additional step 380 may be performed subsequent to step 197. During step 380, the controller may remove the switch port at which the discovery packet was received (i.e., the destination switch port identified during step 193) and the source switch port (i.e., the switch port identified in the discovery packet during step 195) from the maintenance and/or quarantine queues. In other words, the source and destination switch ports of a discovered link may be removed from the maintenance and quarantine queues.

The foregoing is merely illustrative of the principles of this invention and various modifications can be made by those skilled in the art without departing from the scope and spirit of the invention.

What is claimed is:

1. A method of using a controller that controls client switches in a network having non-client switches and end hosts that are coupled to the client and non-client switches, the method comprising:

maintaining, at the controller, a link discovery table including entries that identify links between client switches;

processing, at the controller, the entries of the link discovery table to generate a network domain topology that includes client domains formed from client switches and non-client domains formed from non-client switches, wherein the client domains are separated by intervening non-client domains;

selecting, using the controller, a link discovery table entry of the link discovery table;

generating a classification, using the controller, for the link identified by the selected link discovery table entry based on timestamp information in the selected link discovery table entry;

identifying, using the controller, broadcast ports of the client switches from the link classification generated based on the timestamp information in the selected link discovery table entry;

identifying, using the controller, a broadcast domain associated with the non-client switches based on the identified broadcast ports;

generating, using the controller, client domains from groups of the client switches;

generating, using the controller, network topology information based on the generated client domains and the identified broadcast domain;

generating, using the controller, flow table entries for the client switches based on the generated network topology information; and controlling, using the controller, the client switches to forward network packets through the network by providing the flow table entries to the client switches.

2. The method defined in claim 1 further comprising:
directing, using the controller, the client switches to send broadcast discovery packets from the broadcast ports of the client switches, wherein the broadcast discovery packets identify that the broadcast discovery packets should be flooded throughout the network by the client and non-client switches.

3. The method defined in claim 2 further comprising:
directing, using the controller, the client switches to send directed discovery packets from additional ports of the client switches.

4. The method defined in claim 3 further comprising:
providing, using the controller, additional flow table entries to the client switches that direct the client switches to forward discovery packets received at the additional ports of the client switches to the controller.

5. The method defined in claim 3 further comprising:
receiving, at the controller, a discovery packet from a client switch, wherein the discovery packet identifies a source client switch that sent the discovery packet and a destination client switch that received the discovery packet; and
generating, at the controller, a link discovery table entry that identifies a link from the source client switch to the destination client switch.

6. The method defined in claim 5 further comprising:
determining, at the controller, whether the received discovery packet is a broadcast discovery packet or a directed discovery packet;
in response to determining that the received discovery packet is a broadcast discovery packet, storing a broadcast discovery timestamp in the link discovery table entry; and
in response to determining that the received discovery packet is a directed discovery packet, storing a directed discovery timestamp in the link discovery table entry.

7. The method defined in claim 6 wherein generating the classification comprises:
classifying the link identified by the selected link discovery table entry based on the broadcast discovery timestamp and directed discovery timestamp of the selected link discovery table entry.

8. The method defined in claim 1 wherein each link of the link discovery table includes source and destination ports, wherein the links of the link discovery table include broadcast links and direct links, and wherein identifying the broadcast ports of the client switches comprises:
selecting a port from the source and destination ports of the link discovery table; and
in response to determining that the selected port is included in at least one broadcast link of the link discovery table, classifying the selected port as a broadcast port.

9. The method defined in claim 8 wherein identifying the broadcast ports of the client switches further comprises:
determining whether the selected port is included in at least three links; and
in response to determining that the selected port is included in at least three links, classifying the selected port as a broadcast port.

10. The method defined in claim 9 wherein identifying the broadcast ports of the client switches further comprises:
determining whether the selected port is included in at least one pair of asymmetrical links; and
in response to determining that the selected port is included in at least one pair of asymmetrical links, classifying the selected port as a broadcast port.

11. The method defined in claim 10 further comprising:
selecting, at the controller, a broadcast port;
identifying, using the controller, all reachable ports from the selected broadcast port through the broadcast and direct links of the link discovery table; and
forming, using the controller, a non-client domain from the selected broadcast port and the reachable ports from the selected broadcast port.

12. The method defined in claim 11 wherein identifying the reachable ports from the selected broadcast port through the broadcast and direct links of the link discovery table comprises:
computing a reachability graph using the broadcast and direct links of the link discovery table.

13. A method of using a controller that controls client switches in a network having non-client switches and end hosts that are coupled to the client and non-client switches, the method comprising:
maintaining a link discovery table including entries that identify links between client switches; and
processing the entries of the link discovery table to determine a network domain topology that includes client domains formed from client switches and non-client domains formed from non-client switches, wherein the client domains are separated by intervening non-client domains, wherein the client switches include ports;
classifying the links of the entries of the link discovery table;
classifying the ports of the client switches based on the classified links, wherein determining the network domain topology comprises determining the network domain topology based on the classified ports;
directing the client switches to send broadcast discovery packets from the ports of the client switches, wherein the broadcast discovery packets identify that the broadcast discovery packets should be flooded throughout the network by the client and non-client switches;
directing the client switches to send directed discovery packets from the ports of the client switches;
receiving a discovery packet from a client switch, wherein the discovery packet identifies a source client switch that sent the discovery packet and a destination client switch that received the discovery packet;
generating a link discovery table entry that identifies a link from the source client switch to the destination client switch;
determining whether the received discovery packet is a broadcast discovery packet or a directed discovery packet;
in response to determining that the received discovery packet is a broadcast discovery packet, storing a broadcast discovery timestamp in the link discovery table entry; and
in response to determining that the received discovery packet is a directed discovery packet, storing a directed discovery timestamp in the link discovery table entry, wherein classifying the links of the entries of the link discovery table comprises:
selecting a link discovery table entry of the link discovery table; and
classifying the link identified by the selected link discovery table entry based on the broadcast discovery timestamp and directed discovery timestamp of the selected link discovery table entry.

14. The method defined in claim 13, further comprising:
- with the controller, recording an identification associated with classifying the link identified by the selected link discovery table entry in the link discovery table entry;
- with the controller, identifying network topology information associated with the network based at least partially on the selected link discovery table entry; and
- with the controller, controlling the client switches to forward network packets through the network based on the identified network topology information.

15. The method defined in claim 14, wherein controlling the switches comprises:
- generating flow table entries based on the identified network topology information; and
- providing the generated flow table entries to the client switches.

\* \* \* \* \*